US006189048B1

(12) United States Patent
Lim et al.

(10) Patent No.: US 6,189,048 B1
(45) Date of Patent: Feb. 13, 2001

(54) MECHANISM FOR DISPATCHING REQUESTS IN A DISTRIBUTED OBJECT SYSTEM

(75) Inventors: Swee Boon Lim, Mountain View; Sanjay R. Radia, Fremont; Ken M. Cavanaugh, III, Montara; Christian J. Callsen, Menlo Park, all of CA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 08/670,700

(22) Filed: Jun. 26, 1996

(51) Int. Cl.[7] ............................... G06F 9/00; G06F 9/46; G06F 15/163
(52) U.S. Cl. ............................................. 709/330
(58) Field of Search ..................................... 395/680, 683, 395/684; 709/300, 303, 304, 315, 310

(56) References Cited

U.S. PATENT DOCUMENTS 5,737,607 * 4/1998 Lim et al. .............................. 395/701

OTHER PUBLICATIONS

The Common Object Request Broker Architecture and Specification, OMG, pp. 2–1 2–16 and 5–1 –5–4 , Jul. 1995.*

OMG TC Document 95.3.xx [Revised 1.8 jm], "Corba 2.0/Interoperability: Universal Networked Objects" (Mar. 20, 1995), OMG, pp. 1–79.*

* cited by examiner

Primary Examiner—Majid Banankhah
Assistant Examiner—Pat Caldwell
(74) Attorney, Agent, or Firm—Beyer Weaver & Thomas, LLP

(57) ABSTRACT

Data structures, methods and devices for reducing computing overhead associated with dispatching a distributed object invocation and improving the flexibility of the dispatch framework in a distributed client/server based computing system are disclosed. In one aspect of the invention, a request received on an end point in a transport layer is dispatched from the transport layer to a subcontract in a subcontract layer where the request is partially unmarshaled and dispatched from the subcontract to a skeleton function in a skeleton layer where a servant is invoked. In another aspect of the invention a method for initializing a subcontract which includes a skeleton dispatch function arranged to dispatch a received request to an appropriate skeleton after the subcontract has unmarshaled at least a portion of the received request involves registering the subcontract with at least one cluster end point registry, creating a subcontract meta object associated with the subcontract, and storing the subcontract meta object in a subcontract registry.

21 Claims, 14 Drawing Sheets

FIG. 2

Subcontract Registry (200)

| SUBCONTRACT IDENTIFIER | QUALITY OF SERVICE LIST | SUBCONTRACT CLIENT REP CREATE FUNCTION | OTHER FUNCTIONS |
|---|---|---|---|
| 1 | [ (CLEAN SHUTDOWN, NO) (SECURITY, AUTHENTICATE NT5) (PERSISTENCE, YES) (SERVER ACTIVATION, YES) ] | CLIENT REP CREATE1 | UNMARSHAL, DESTRINGIFY, BAD SERVER HANDLER, ETC. |
| 2 | [ (CLEAN SHUTDOWN, YES) (SECURITY, AUTHENTICATE NT5) (PERSISTENCE, YES) (SERVER ACTIVATION, YES) ] | CLIENT REP CREATE2 | ... |
| 3 | [ (CLEAN SHUTDOWN, YES) (SECURITY, AUTHENTICATE NT5) (PERSISTENCE, YES) (SERVER ACTIVATION, NO) ] | CLIENT REP CREATE3 | ... |
| ... | ... | ... | ... |

Implementation Registry (250)

| IMPLEMENTATION IDENTIFIER | SUBCONTRACT META OBJECT POINTER | INTERFACE IDENTIFIER | READY FLAG | CALL BACK FUNCTIONS | SKELETON INFORMATION |
|---|---|---|---|---|---|
| PRINTER | PTR1 | PRINTER INTERFACE | YES | LOOK UP POST INVOKE REVOKE DEACTIVATE SHUTDOWN | SKELETON DISPATCH FUNCTION, ETC. |
| MODEM | PTR2 | MODEM INTERFACE | YES | LOOK UP POST INVOKE REVOKE DEACTIVATE SHUTDOWN | ... |
| ... | ... | ... | YES/NO | ... | ... |

252, 254, 256, 257, 258, 259

MECHANISM FOR DISPATCHING REQUESTS IN A DISTRIBUTED OBJECT SYSTEM

CROSS REFERENCE TO RELATED APPLICATIONS

U.S. patent Ser. No. 08/554,794, entitled "Method and Apparatus for SubContracts in Distributed Processing Systems," filed Nov. 7, 1995 as a continuation to Ser. No. 07/995,863, filed Dec. 21, 1992 (now abandoned), is related to the present application and is incorporated by reference herein in its entirety. Additionally, the following U.S. patent applications, are related to the present application and are also incorporated by reference herein in their entirety: Ser. No. 08/670,682, filed Jun. 26, 1996, now U.S. Pat. No. 6,044,224; Ser. No. 08/673,181, filed Jun. 26, 1996, now U.S. Pat. No. 6,032,199; Ser. No. 08/670,681, filed Jun. 26, 1996, now U.S. Pat. No. 6,044,409; Ser. No. 08/670,684; and Ser. No. 08/669,782, filed Jun. 26, 1996, now U.S. Pat. No. 5,991,823.

BACKGROUND OF THE INVENTION

1. Field of Invention

The present invention relates to the fields of distributed computing systems, client-server computing, and object-oriented programming. More particularly, the invention relates to methods and devices for dispatching a distributed object invocation.

2. Description of Prior Art

A computing environment in which objects located on different computers are linked by a network is typically referred to as a client-server computing environment. Some of the computers act as providers of services or functionality to other computers. Others of the computers act as consumers of services or functionalities. The providers of service or functionality are known as "servers", and the consumers of the service or functionality are called "clients". The client-server model may also be generalized to the case where distinct programs running on the same computer are communicating with one another through some protected mechanism and are acting as providers and consumers of service or functionality.

Attempts to provide such a distributed system have been made using object-oriented methodologies that are based upon a client-server model in which server objects provide interfaces to client objects that make requests of the server objects. Typically, in such a distributed system, the servers are objects consisting of data and associated methods. The client objects obtain access to the functionalities of the server objects by executing calls on them, which calls are mediated by the distributed system. When the server object receives a call, it executes the appropriate method and transmits the result back to the client object. The client object and server object communicate through an Object Request Broker (ORB) which is used to locate the various distributed objects and to establish communications between objects. Distributed objects may exist anywhere in a network, as for example in the address space of the client, in multiple address spaces on the client machine, and in multiple machines across the network.

The software industry has responded to the need for a distributed object technology by forming the Object Management Group (OMG). The goal of the OMG is to define the Object Management Architecture (OMA), which has four major components: the Object Request Broker (ORB), Object Services, Common Facilities, and Application Objects. The Object Request Broker provides basic object communications and management services, thereby forming the basis of a distributed object system. A standard for an Object Request Broker is contained in the Common Object Request Broker Architecture (CORBA) specification.

In typical client-server systems, performance overhead can be costly. That is, the speed and quality of a process within the system may be compromised by inefficient uses of application code and methods associated with gathering information from the process and with routing information within a process. By way of example, the performance overhead associated with dispatching requests on the server side of a system is often relatively high. Further, the internal dispatch framework within a client-server system is typically such that any change to the framework requires substantial changes to be made in application code. That is, by way of example, if it is desired for the relationship between a given transport and a skeleton to be altered, a significant amount of the internal dispatch framework, and, hence, the application code must be changed in most instances. Further, client-server systems typically do not efficiently include and execute application code provided by a developer. In other words, customizing an internal dispatch framework is often inefficient. As a result, there is a limited amount of flexibility in a typical internal dispatch framework. Consequently, the provision of methods and devices which would reduce the performance overhead associated with dispatching requests on the server side of a system and improve the flexibility of the internal dispatch framework is desirable.

SUMMARY OF THE INVENTION

To achieve the foregoing and in accordance with the purpose of the present invention, data structures, methods and devices for reducing computing overhead associated with dispatching a distributed object invocation and improving the flexibility of the dispatch framework in a distributed client/server based object oriented operating system are disclosed. In one aspect of the invention, a request received on an end point in a transport layer is dispatched from the transport layer to a subcontract in a subcontract layer where the request is partially unmarshaled. The partially unmarshaled request is then dispatched from the subcontract to a skeleton function in a skeleton layer where a servant is invoked. In some embodiments, the transport layer does not perform any unmarshaling functions and the dispatch of the request from the transport layer to the subcontract layer is accomplished by invoking a closure which identifies a marshal buffer which holds the request.

In other embodiments, the skeleton function in the skeleton layer is arranged to unmarshal at least a part of the partially unmarshaled request. In alternative embodiments, additional layers may also be provided in order to further increase the system's modularity. By way of example, the subcontract layer ma y be subdivided into a two or more sublayers.

In another aspect of the invention, a method for initializing a subcontract which includes a skeleton dispatch function arranged to dispatch a received request to an appropriate skeleton after the subcontract has unmarshaled at least a portion of the received request is disclosed. The subcontract initialization includes the steps of creating a subcontract meta object associated with the subcontract and storing the subcontract meta object in a subcontract registry. In some embodiments, a dedicated end point associated with the subcontract is initialized. In others, the subcontract is registered with at least one cluster end point registry and a unique end point with which the cluster end point registry is associated.

In still another aspect of the invention, an end point dispatch registry data structure includes a subcontract identifier arranged to identify an associated subcontract and a closure arranged to identify a dispatch function associated with the subcontract. In some embodiments, the closure includes a pointer to the dispatch function and a pointer to a data element which contains information used by the dispatch function.

BRIEF DESCRIPTION OF THE DRAWINGS

The invention, together with further advantages thereof, may best be understood by reference to the following description taken in conjunction with the accompanying drawings in which:

FIG. 2 is a diagrammatic representation of a subcontract registry data structure in accordance with one embodiment of the present invention.

FIG. 3 is a diagrammatic representation of an implementation registry data structure in accordance with one embodiment of the present invention.

DETAILED DESCRIPTION OF THE INVENTION

Figure 1A:
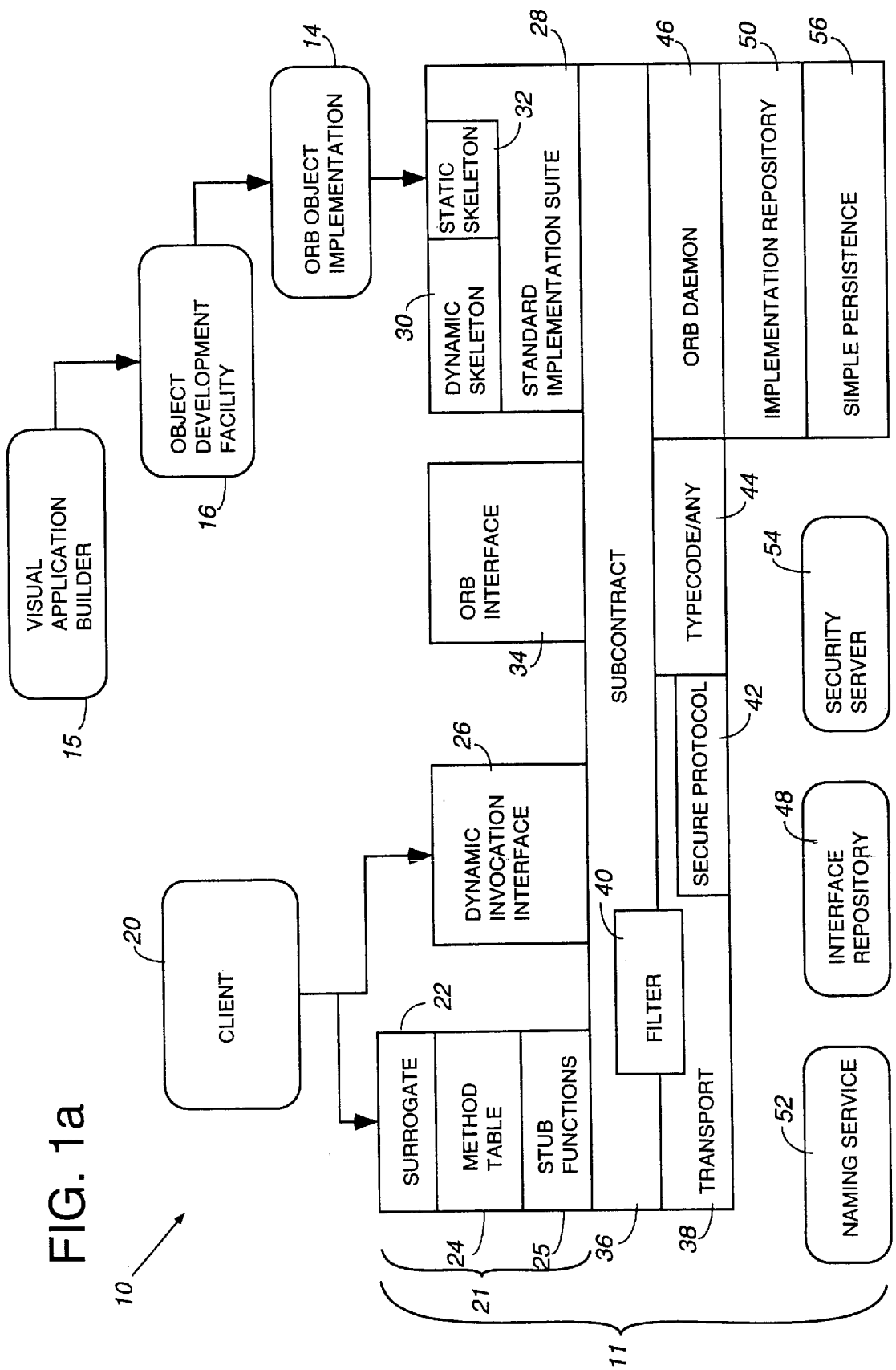
FIG. 1a is a symbolic overview of a distributed object system.
Figure 1B:
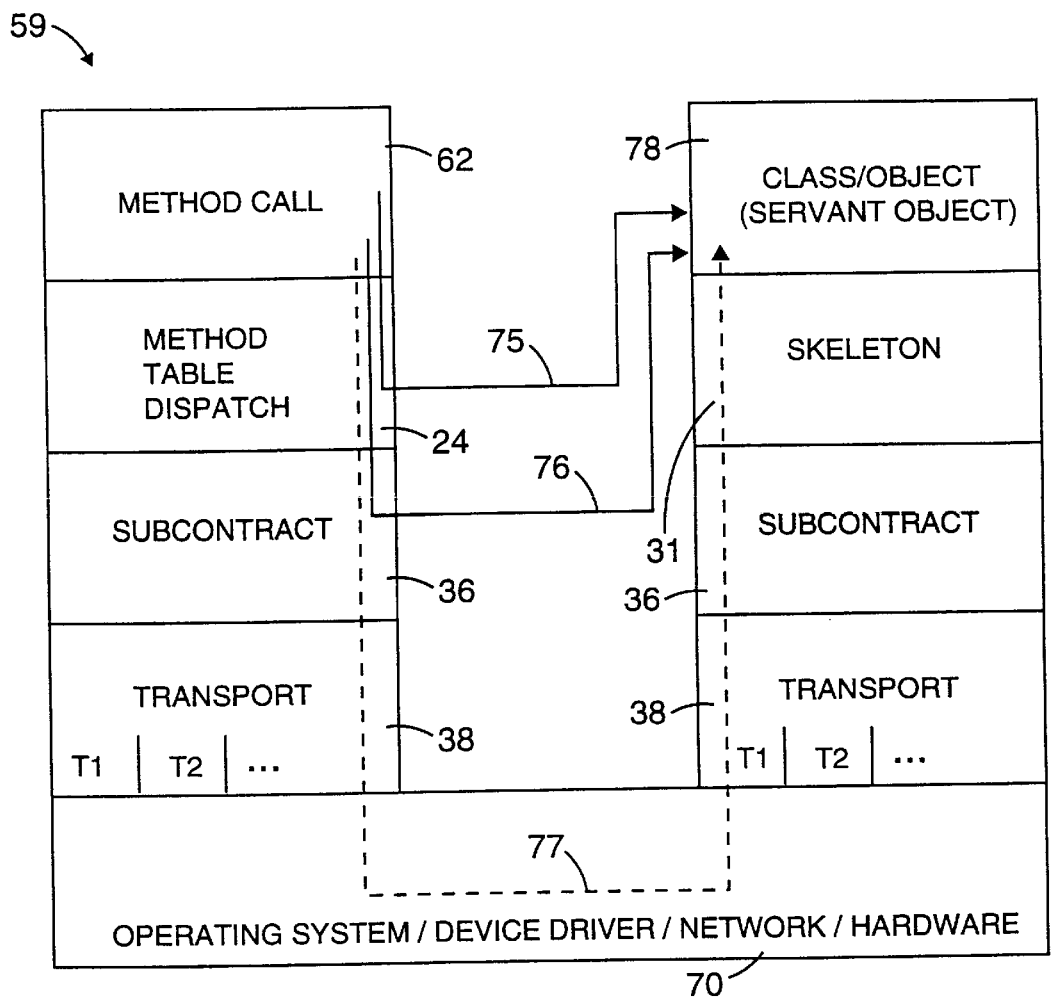
FIG. 1b is a diagrammatic illustration which represents how a request by a client is routed through the architecture of a client side and a server side of a distributed object system, and the interface between the client side and the server side of the distributed object system.
Figure 1C:
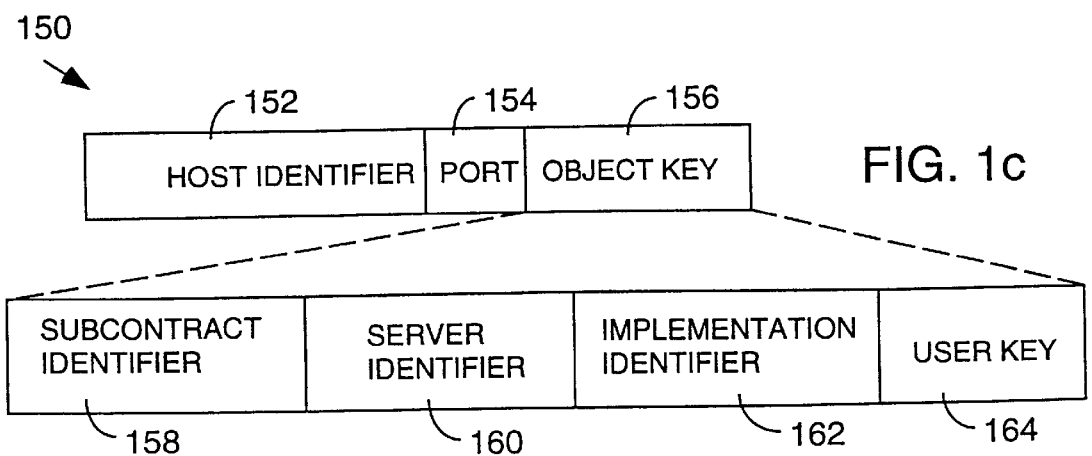
FIG. 1c is a diagrammatic representation of an object reference suitable for use over a network in accordance with one embodiment of the present invention.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, the present invention will be described primarily within the context of an Object Request Broker (ORB) implemented under the CORBA specification from the OMG, Revision 2.0, dated July 1995, which is incorporated herein by reference. FIG. 1a diagrammatically illustrates the overall architecture of a representative distributed object system suitable for implementing the present invention. FIG. 1b diagrammatically illustrates some possible flow paths that a request from a client to a servant object may follow within such an architecture that includes a three level dispatch mechanism. FIG. 1c shows one object reference data structure that may be used by a client to refer to a servant object.

A distributed object system 10 typically includes an Object Request Broker (ORB) 11 as is symbolically illustrated in FIG. 1a. ORB 12 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of distributed object or a process. Normal object implementation 14 is a representation of an object type defined in a traditional object programming language, such as C++. A wide variety of representations are possible. By way of example, an object implementation 14 may be a simple C++ object type that has been provided by an application developer. Alternatively, an implementation for an object type may be developed within a visual application builder 15. This visual application builder allows a developer to visually select existing object types from a catalog and graphically connect the services provided by one object to the services needed by another (attributes, arguments, etc.) in order to create a new implementation for an object type.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a method table dispatch 24, a subcontract layer 36, possibly a filter 40, and a transport layer 38. Stub 21 includes a surrogate 22, a method table 24, and a stub function 25. Client 20 communicates initially with surrogate 22 which appears to the client as the server object. Alternatively, client 20 may communicate directly with the server object through a dynamic invocation interface (DII) 26 instead of through surrogate 22, method table 24, and stub function 25. Dynamic invocation interface 26 is used to enable clients, as for example client 20, to construct dynamic requests. One procedure by which a client makes a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554,794, filed Nov. 7, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in above-referenced U.S. patent application Ser. No. 08/670,682, filed Jun. 26, 1996, now U.S. Pat. No. 6,044,224. Filter 40, if being used, may perform a variety of tasks, such as compression, encryption, tracing, or debugging, which are to be applied to communications to and from an object.

Transport layer 38 operates to marshal, unmarshal and physically transport information to and from a servant that typically does not share the same process as a client. A technique for marshaling/unmarshaling an object reference is described in above-referenced U.S. patent application Ser. No. 08/670,681, filed Jun. 26, 1996, now U.S. Pat. No. 6,044,409. Mechanisms for marshaling and unmarshaling are described in above-referenced U.S. patent application Ser. No. 08/673,181, filed Jun. 26, 1996, now U.S. Pat. No. 6,032,199.

A standard implementation suite 28 (or object adapter) represents a set of subcontracts that interact with ORB objects 14 in identical ways, as for example object key management. One such implementation suite is described in above-referenced U.S. patent application Ser. No. 08/669,782, filed Jun. 26, 1996, now U.S. Pat. No. 5,991,823. It should be duly noted that a subcontract may belong to multiple implementation suites. Hence, other implementation suites that utilize different subcontracts are possible. A skeleton, which may take the form of either static skeleton 32 or dynamic skeleton 30 is used to transform requests into a format required by a servant object 14. Thus, skeletons 32, 30 call an appropriate servant object 14. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter. An ORB Daemon 46 is responsible for ensuring that object servers are active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between process on the same machine. The security server 54 is a security administration server that secures the services that are used between processes on different computers.

Typecode/Any module 44 implements typecode and "Any" objects. Typecode describes an Interface Definition Language (IDL) data type, allowing type descriptions to be transmitted between clients and servers. An instance of an IDL data type may be encapsulated by an "Any" object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A name server 52 is used to name ORB objects. A client, as for example client 20, may use name server 52 to find a desired object by name. Name server 52 returns an object reference, which in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 1b. The request is initiated by a client and may take any suitable form. The form of the request will depend to a large extent upon the nature of the programming language used to create the client. By way of if the client is written in the C++ language, the request may take the form of a C++ method call 62. The call is made to a designated object reference taking the form of a surrogate. The surrogate includes methods that comply with the object's interface. As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers, or location indicators. A first pointer points to a client representation ("client rep") associated with the referenced object. A second pointer points to a method table of the method table dispatch 24 that is associated with the referenced object. It should be appreciated that as used herein, the term "pointer" is used to identify not only locations in computer or network memory, but also to refer to a location indicator in general. A client representation is an object that has methods which support invocation as well as CORBA defined "pseudo" object reference operations. These operations include, but are not limited to, a duplicate method, a release method, a narrow method, a hash method, and an is_equivalent method.

After the client has initiated a call, the call is processed using a method table dispatch mechanism 24. Such a technique is disclosed in U.S. patent application Ser. No. 08/307,929 and is hereby incorporated by reference. The method table dispatch mechanism uses a method table that contains a list of pointers to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate stub function 25 to process the method call, and then pairs the method call with the appropriate stub function 25. In the event that the client making the method call is in the same process as the servant object, a local stub function is called. The local stub function sends the method call directly to servant object 78. A technique for routing calls within a local process is described in above-referenced U.S. patent application Ser. No. 08/670,684, filed Jun. 26, 1996. Alternatively, if the servant object is in a different process, i.e. a remote process, a remote stub function is called. The remote stub function invokes the client representation, which delivers the invocation to servant object 78.

Subcontracts implemented by subcontract layer 36 are logic modules which provide control of the basic mechanisms of object invocation and argument passing that are important in distributed object systems. A subcontract implemented by subcontract layer 36 determines a specific quality of service for use by an object. A subcontract is uniquely identified by a subcontract identifier, which is typically embedded in an object reference. A quality of service is a set of service properties. Among possible service properties which are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., which is a part of the transport layer 38, is used to marshal and physically transport information to and from servant objects. Information. i.e. the object reference or the request, is converted into protocols appropriate to a given domain. By way of example, protocols may include, but are not limited to, Ethernet protocols and internet interoperable protocols (IIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system. While transport mechanisms require a conversion of information into a protocol appropriate to a given domain, some transport mechanisms to do not require the encoding of information for different domains. One transport mechanism which does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol which may be used by a different machine by virtue of the fact that information is remaining on the same host and therefore does not require a change of domain. Hence, information may simply be "flattened out," or marshaled into a stream which is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point which is a part of transport layer 38. In the event that an end point is not created by transport layer 38, transport layer 38 provides the functionally needed for the end point to be created by subcontract layer 36. By way of example, a door end point is typically created by subcontract layer 36, while other end points, including network and TCP/IP end points, are typically created by transport layer 38. Regardless of whether end points are created by subcontract layer 36 or transport layer 38, end points "live in," i.e. are a part of, transport layer 38. End points are essentially ports which receive information from a different domain. After an end point in transport layer 38 receives information transported from a different domain, the end point then dispatches the information from transport layer 38 to subcontract layer 36. Subcontract layer 36, or more specifically the subcontract in subcontract layer 36 which receives the information, then dispatches the information to the skeleton and the servant.

Subcontract layer 36 provides the functionality to unmarshal at least some of the information it has received. That is, subcontract layer 36 unmarshals at least part of the request. Then, the request is dispatched to a skeleton 31 which transforms the request into an implementation specific format required by servant object 78. The skeleton may either be a static skeleton or a dynamic skeleton as described above.

In general, a remote request must be routed through the client side and the server side as described above. The method call 62 is received, method table dispatch layer 24 is used to identify an appropriate subcontract prior to the selection of a transport mechanism in transport layer 38 which marshals the request and prepares it for transport to another domain. Through hardware 70, the marshaled request is transported to the server side where it is received on an end point which is a part of transport layer 38. An appropriate end point receives information transported across a wire, and information is dispatched from transport layer 38 to subcontract layer 36, which provides the functionality to at least partially unmarshal the information it has received. The subcontract then dispatches the request to skeleton 31 which transforms the request into a specific format required by servant object 78. This path is shown by arrow 77, and is the path which may be taken by both remote and local requests.

However, if a client and a server are in a local process, i.e. both the client and the server are in the same process, the use of the path shown by arrow 77 as described above is unnecessarily complex. If it is known that the client and the server are in the same process, it is possible to shorten the invocation, or flow, path of a request for service. If a local process may be identified when an object reference is created, shortened flow paths, i.e. the paths represented by arrows 75 and 76, may be taken to send a request from what is a client to a server which are on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 1c will now be used to describe an embodiment of an object reference. As will be familiar to those skilled in the art, object references may take a variety of forms depending upon the location within the process that they are being held at any given time. However, by way of background, a representative object reference for use in a system which utilizes a low overhead object adapter is illustrated in FIG. 1c. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer which is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

Internal dispatch mechanism frameworks generally require a significant amount of performance overhead when they are utilized, as internal searches must typically be made within a server to determine the appropriate dispatch mechanism to use to route a particular request. The dispatch mechanism used to route a particular request is typically dependent upon a variety of factors including: 1) where the request originates; 2) the end point which receives the request when on the server side; and 3) the skeleton that is used to invoke the requested servant method. Also, any change which is made to any portion of the internal dispatch mechanism framework typically requires the alteration of a significant portion of code. Further, internal dispatch mechanism frameworks typically do not efficiently implement external application code provided by a developer. Therefore, an internal dispatch mechanism framework is not generally flexible in terms of enabling changes to the framework to be readily made, regardless of whether the changes to the framework are changes to existing code or whether the changes to the framework involve the addition of external code provided by an application developer.

To overcome these drawbacks, the present invention utilizes a multi-layered dispatch mechanism framework that utilizes the concept of a subcontract layer which exists between the transport layer and the skeleton layer. The use of such a three layer dispatch mechanism, together with associated data structures, serves to both reduce overhead associated with dispatching requests and increase the flexibility of the framework. The dispatch layers may be thought of as levels through which a request is dispatched. In the described embodiment, the transport layer receives an incoming request and dispatches the request to an appropriate subcontract (out of a plurality of subcontracts in the subcontract layer) without unmarshaling any of the request. In alternative embodiments, the transport layer may do a minimal amount of unmarshaling of the request. The selected subcontract unmarshals at least a portion of the request, identifies the appropriate skeleton, and dispatches the request to an appropriate skeleton which in turn invokes the servant. It should be appreciated that this multi-layered approach provides a great deal of flexibility in altering the framework. Specifically, an entirely new dispatch mechanism can be created simply by writing and implementing a new subcontract or suite of subcontracts. When the new subcontract(s) is/are implemented, there is no need to alter either the transport layer or the skeleton layer. As will be appreciated by those skilled in the art, this provides a significant advantage when it comes to implementing new features and/or functionalities in the distributed object environment.

The performance overhead associated with dispatching a request on the server side may be further reduced by implementing data structures. By way of example, an end point dispatch registry may be provided which identifies each (and only) dispatch mechanisms associated with a given end point. With this arrangement, a search for an appropriate dispatch mechanism to use for an end point may be narrowed to a search of the data structure which contains the dispatch mechanisms associated with the end point. Hence, the performance overhead associated with searching for a dispatch mechanism may be reduced. One configuration of an end point dispatch registry data structure will be described below with reference to FIG. 6.

Other data structures which are used in the described embodiment to reduce the performance overhead associated with dispatching a request on the server side of a client-server system include a subcontract registry data structure and an implementation registry data structure. The subcontract registry data structure and the implementation registry data structure list subcontracts and implementation definitions, respectively, thereby enabling searches for subcontracts and implementation definitions to be concentrated on the respective registry data structures. Hence, the number of resources used to search for subcontracts and implementation definitions may be reduced, thereby improving system efficiency. Suitable subcontract and implementation registry data structures are illustrated in FIGS. 2 and 3, respectively.

Referring next to FIG. 2 a subcontract registry data structure 200 in accordance with one embodiment of the present invention will be described. Subcontract registry data structure 200, or, simply, subcontract registry 200, stores information that associates a particular quality of service with a unique subcontract identifier and with a subcontract client representation create function. Subcontract registry 200 registers information pertaining to subcontracts in a tabular form, and makes available subcontracts within a system available for searching. The tabular form is advantageous in that it allows any number of implementations to be associated with a particular subcontract, as is discussed in more detail in co-pending patent application Ser. No. 08/670,684 filed concurrently herewith. It should be appreciated that although a predetermined number of permutations of features within a system are possible, subcontract registry 200 may identify only a subset of these possible subcontracts that have been implemented within the distributed object system. Subcontract registry 200 may be implemented as a hash table, linked list or any other suitable data structure.

In the embodiment shown, subcontract registry 200 includes a subcontract identifier (SCID) column 202, an associated quality of service list column 204, a subcontract client representation create function column 206, and pointers to other functions 208. Each row 210 of subcontract registry 200 is termed a subcontract meta object and, by way of example, may be implemented as a C++ object. In the embodiment shown, a plurality of subcontract meta objects 212, 214 and 216 are provided in subcontract registry 200. The first subcontract meta object 212 has a subcontract identifier of "1" and will herein be identified as Subcontract 1. Subcontract 1 lists the following features for its quality of service: clean shutdown, security, persistence and server activation. The name-value pairs in this quality of service list indicate that a clean shutdown will not be implemented, an authentication protocol using NT5 will be used for security, and persistence is turned on. A plurality of pointers, or location indicators, to various other functions associated with each subcontract meta object in other functions column 208 include pointers to an unmarshal function, a destringify function, and a bad server identifier handler.

The second subcontract meta object 214 shown in subcontract registry 200 is the subcontract meta object associated with the subcontract identified as subcontract 2. The quality of service list for this subcontract indicates that server activation is present. The third subcontract meta object 216 indicates that the subcontract identified as subcontract 3 will allow for transactions, clean shutdowns, and server activation.

Subcontract registry 200 will typically have a group of associated functions that are used to organize and access the registry. By way of example, the associated functions may include an Add function, a Find function, a Get_First function and a Get_Next function. The Add function may be used to add a new quality of service to the table. In the described embodiment, the Add function takes as arguments a subcontract identifier and a subcontract meta object. A Find function takes a subcontract identifier as an argument and returns the subcontract meta object associated with that identifier. The functions Get_First and Get_Next are used to iterate over a subcontract registry, as for example subcontract registry 200, thereby searching it completely for a particular quality of service, and returning the appropriate meta object. When a client wishes to obtain an object reference, which may be a fat pointer in the C++ language, for a particular server object, subcontract registry 200 may be used to look up the subcontract identifier associated with that server object. Once the appropriate subcontract identifier has been located, the appropriate subcontract client representation function is called in order to create a client representation suitable for the particular server object using the appropriate features. In the C++ embodiment, the fat pointer references this client representation.

Referring next to FIG. 3, an implementation registry data structure 250 in accordance with one embodiment of the present invention will be described. Each object in a client-server system is typically associated with an implementation definition. Each implementation definition for an object includes such information as the name of the implementation, the subcontract to use in order to create the object, the interface identifier for the object, a set of call back functions associated with the object, and information which relates to the skeleton. The call back functions may be stored in an object. Implementation registry 250 includes entries which correspond to various implementation definitions. Through the use of implementation registry 250, an implementer of an object server will be able to provide multiple, different implementations of a single ORB object type in the same object server. That is, one object type may have various implementations that are identified by distinct implementation identifiers. Each implementation defines the behavior for all of the operations and attributes of the interface that it supports. That is, each interface may have many implementations. Therefore, each implementation identifier represents a distinct implementation for an object that uses a particular subcontract. In addition, each implementation may use a different subcontract by way of a subcontract pointer. Hence, implementation registry 250 aids in improving the overall efficiency of a client-server system in that it allows an invoking function to choose a particular implementation which, in turn, may use a desired subcontract of the subcontract registry.

Each implementation definition represents an entry in implementation registry 250 that contains pointers to the stored data. Implementation registry 250 includes an implemenatation identifier column 252 that names implementations, a subcontract meta object pointer column 254, an interface identifier column 256, a ready flag column 257, a call back functions column 258, and a skeleton information column 259.

Implementation identifiers in implementation identifier column 252 are names for implementations that are supplied by a developer when implementation definitions are created. A subcontract meta object pointer is a pointer from a particular implementation definition to a subcontract meta object contained in the subcontract registry as described above with respect to FIG. 2. An interface identifier is a fixed, globally unique name for the type of a particular interface. In some embodiments, a ready flag may be a boolean flag which may be set to indicate that the implementation associated with a particular implementation definition has been prepared for use as described in copending patent application Ser. No. 08/669,782, filed Jun. 26, 1996, now U.S. Pat. No. 5,991,823. Skeleton information includes functions which may be used by the skeleton associated with a particular implementation. Call back functions are sets of functions associated with each implementation. A wide variety of call back functions may be associated with a particular implementation. By way of example, the call back functions may include, but are not limited to, look up functions, deactivate functions, and shutdown functions.

Implementation definition entry 262 is an example of an implementation definition which may be found in implementation registry 250. Implementation definition entry 262 is for a PRINTER implementation of the interface PRINTER INTERFACE and has a pointer to a subcontract in a subcontract registry, as for example Subcontract 1 of subcontract registry 200 in FIG. 2. The pointer to a subcontract in a subcontract registry is a subcontract meta object pointer which identifies the appropriate subcontract for a given implementation. Implementation definition 262 also has unique call back functions and a unique skeleton dispatch function with which it is associated.

The implementation registry 250 has a variety of associated functions intended to facilitate organization of and access to the registry. By way of example, a function Add may be used to add an implementation definition with a particular implementation identifier to implementation registry 250. Similarly, a call to a function Find may take as an argument an implementation identifier and search through implementation registry 250 in order to return the implementation definition which is identified by the implementation identifier. With implementation definitions listed in implementation registry 250, the performance overhead associated with searching for implementation definitions may be reduced. It should be appreciated that implementation registry 250 may be implemented as a hash-table, a linked list, or any other suitable data structure.

The flexibility of an internal dispatch mechanism framework which utilizes dispatch layers, or levels, is improved as changes to dispatch mechanisms used to route a request from one level to the next may be made without affecting dispatch mechanisms between subsequent levels. That is, flexibility is enhanced because changes to dispatch method used between two levels of the framework may not necessarily require changes to dispatch methods between other subsequent levels of the framework.

The internal dispatch mechanism for the server side of a distributed object system as described above with reference to FIG. 1b may be called a three-level dispatch mechanism. The three levels in the dispatch mechanism are a first level which is the transport layer, a second level which is the subcontract layer, and a third level which includes the skeleton layer and the servant object layer. The transport layer dispatches a request received on an end point in the transport layer to an appropriate subcontract in the subcontract layer which is associated with the end point. It should be appreciated that the association between the subcontract and the transport end point may be a one-to-one, a one-to-many, a many-to-one, or a many-to-many mapping. After the subcontract in the subcontract layer receives the request, the request is dispatched to the appropriate skeleton in the skeleton layer.

One mechanism which may be used to dispatch a request from the transport layer to the subcontract layer is a closure, or more specifically, a subcontract dispatch closure. A closure contains a pointer to a dispatch function and a pointer to a data element, which is sometimes referred to as a "cookie." A cookie is provided by the subcontract layer when the closure is created. The cookie refers to data required by a specific subcontract to process an incoming request. Hence, the data element differs according to the requirements of each subcontract. In addition, the data element may even differ for the same subcontract if the call may be dispatched to different servant objects.

Once a request is received from another domain on an end point in the transport layer, it is dispatched to a subcontract in the subcontract layer. The actual subcontract computation to be performed may be identified by the closure associated with the subcontract. When a subcontract is initialized, it is "bound to," or associated with, end points which may dispatch requests to the subcontract.

Figure 4:
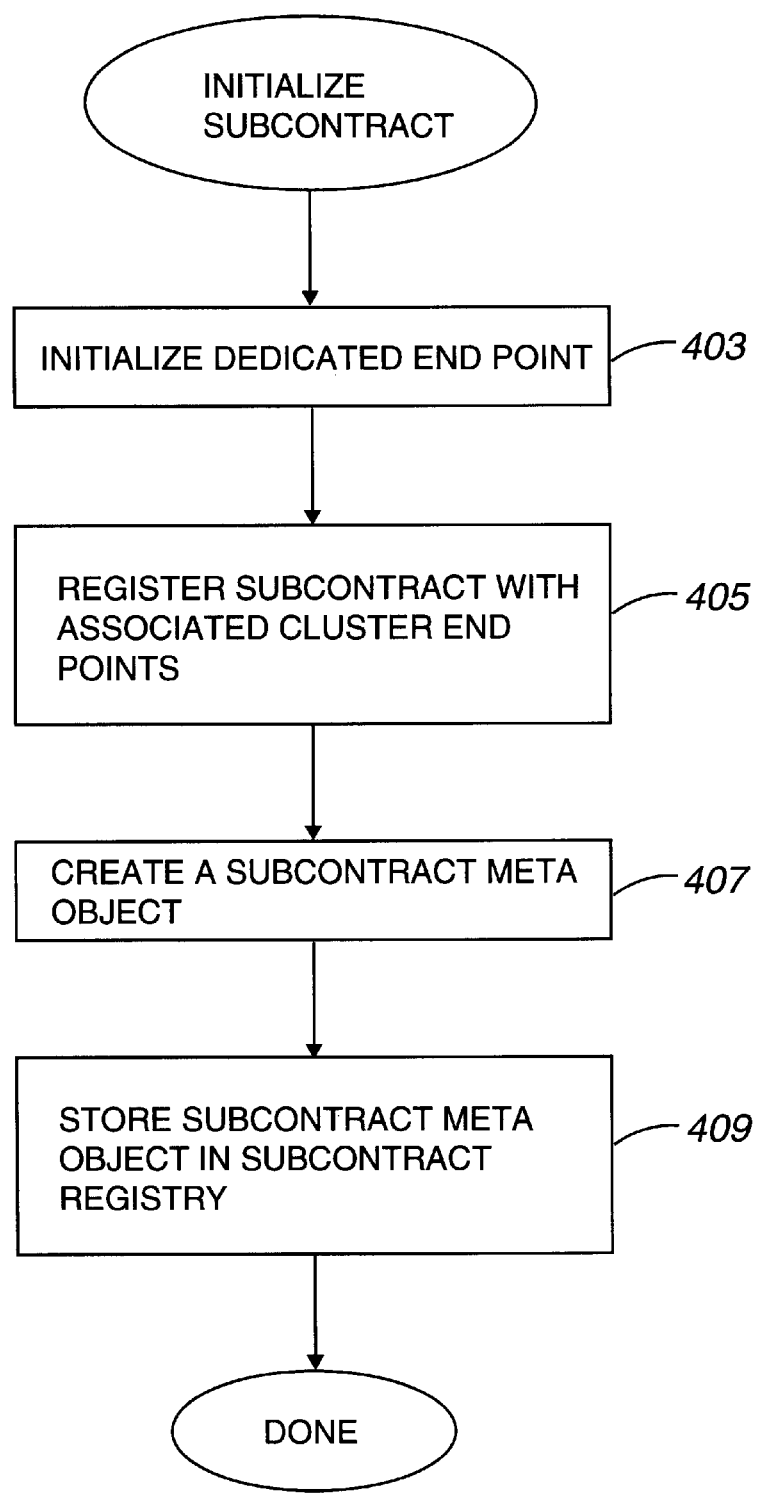
FIG. 4 is a process flow diagram which illustrates a method of initializing a subcontract in accordance with one embodiment of the present invention.

Referring next to FIG. 4, a method of initializing a subcontract in accordance with one embodiment of the present invention will be described. In step 403, any "dedicated" end points that are associated with the subcontract are initialized. It should be appreciated that some subcontracts may not have any dedicated end points, while others may have multiple dedicated end points. A subcontract may also create or initialize additional dedicated end points as needed after subcontract initialization. As mentioned above with respect to FIG. 1b, a dedicated end point is an end point which is associated with only one subcontract. An example of a dedicated end point is a door, which is a gateway between processes on the same host. Doors enable information to be passed between two processes on a host without the having to encode the information for use by a different domain. The process of initializing a dedicated end point will be described in more detail below with reference to FIG. 5. After the dedicated end point is initialized, process control moves to step 405 where the subcontract is registered with associated "cluster" end points. As mentioned above with respect to FIG. 1b, a cluster end point is an end point which may be associated with a plurality of subcontracts. Registering a subcontract with associated cluster end points entails registering the subcontract with the end point dispatch registry associated with each of the cluster end points which is used by the subcontract. A typical end point dispatch registry will be described below with reference to FIG. 6. The actual registration of a subcontract may be accomplished by calling a register function of the cluster end point with the subcontract identifier and a subcontract dispatch closure as arguments.

After the subcontract is registered with associated cluster end points, a subcontract meta object is created in step 407. In other words, step 407 is the step of registering the subcontract with the subcontract registry as described above with reference to FIG. 2. A subcontract meta object may be thought of as a data structure within the subcontract registry which "connects" a particular subcontract to an associated object. In other words, a subcontract meta object is a collection of information which associates a subcontract, through the use of a subcontract identifier, with an object. A subcontract meta object includes, but is not limited to, a quality of service list, a subcontract client representation create function, and other functions, as for example unmarshal functions, associated with a given subcontract. After the subcontract meta object is created, process control moves to step 407 where the subcontract meta object is stored in the subcontract registry. Once the subcontract meta object is placed in the subcontract registry, the process of initializing a subcontract is complete.

Figure 5:
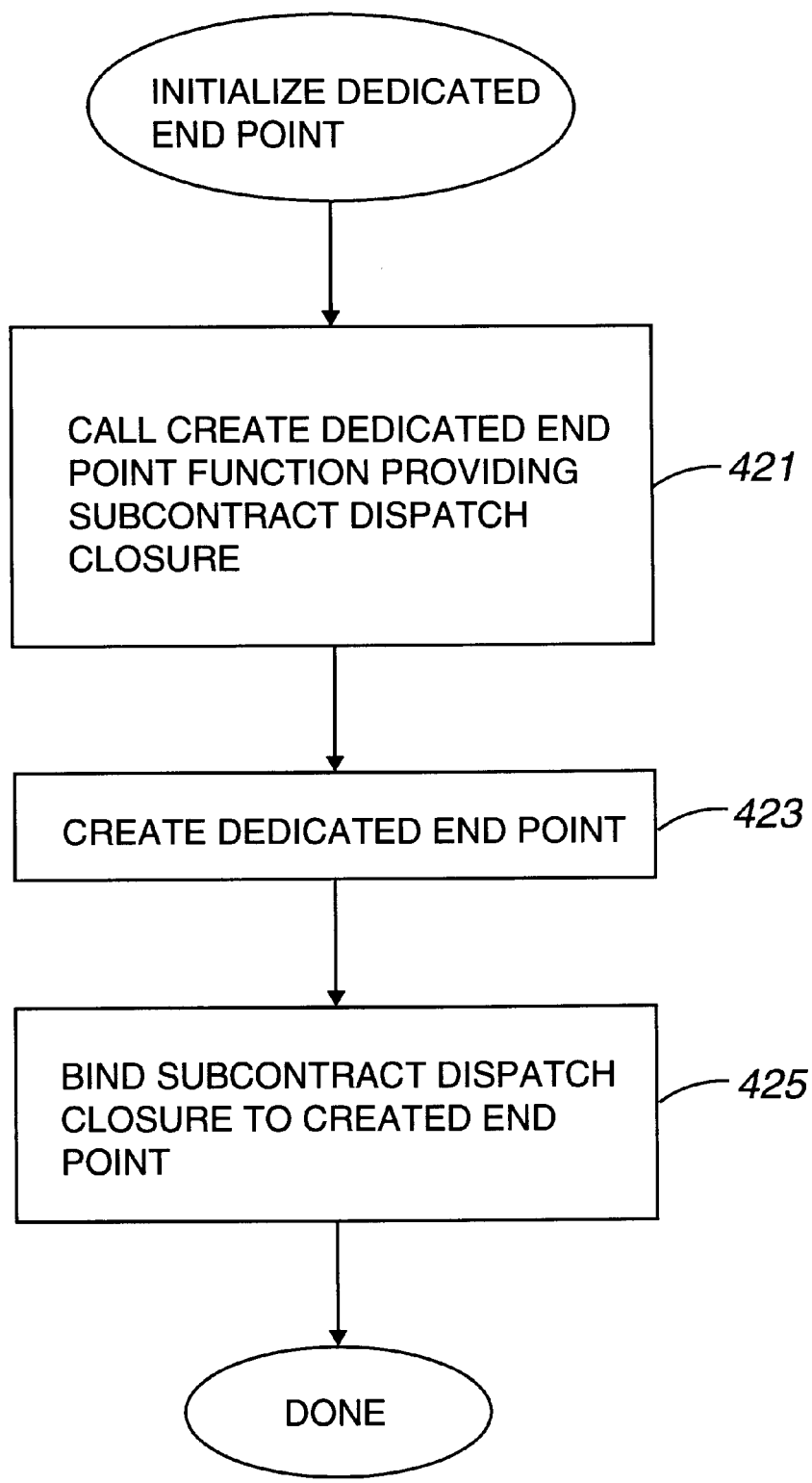
FIG. 5 is a process flow diagram which illustrates a method of initializing a dedicated end point in accordance with one embodiment of the present invention.

Referring next to FIG. 5, a method of initializing a dedicated end point in accordance with one embodiment of the present invention will be described. That is, an implementation of step 403 of FIG. 4, the step of initializing a dedicated end point for a subcontract, will be described. The process of initializing a dedicated end point begins at step 421 where a call is made to a "create dedicated end point" function with the subcontract dispatch closure as an argument. The function used to create a dedicated end point is dependent upon the transport with which the end point is to be associated. In step 423, a dedicated end point is created. After the dedicated end point is created, the subcontract dispatch closure is bound to the newly created dedicated end point in step 425. After the subcontract dispatch closure is bound to the created end point, the process of initializing a dedicated end point is complete.

Figure 6:
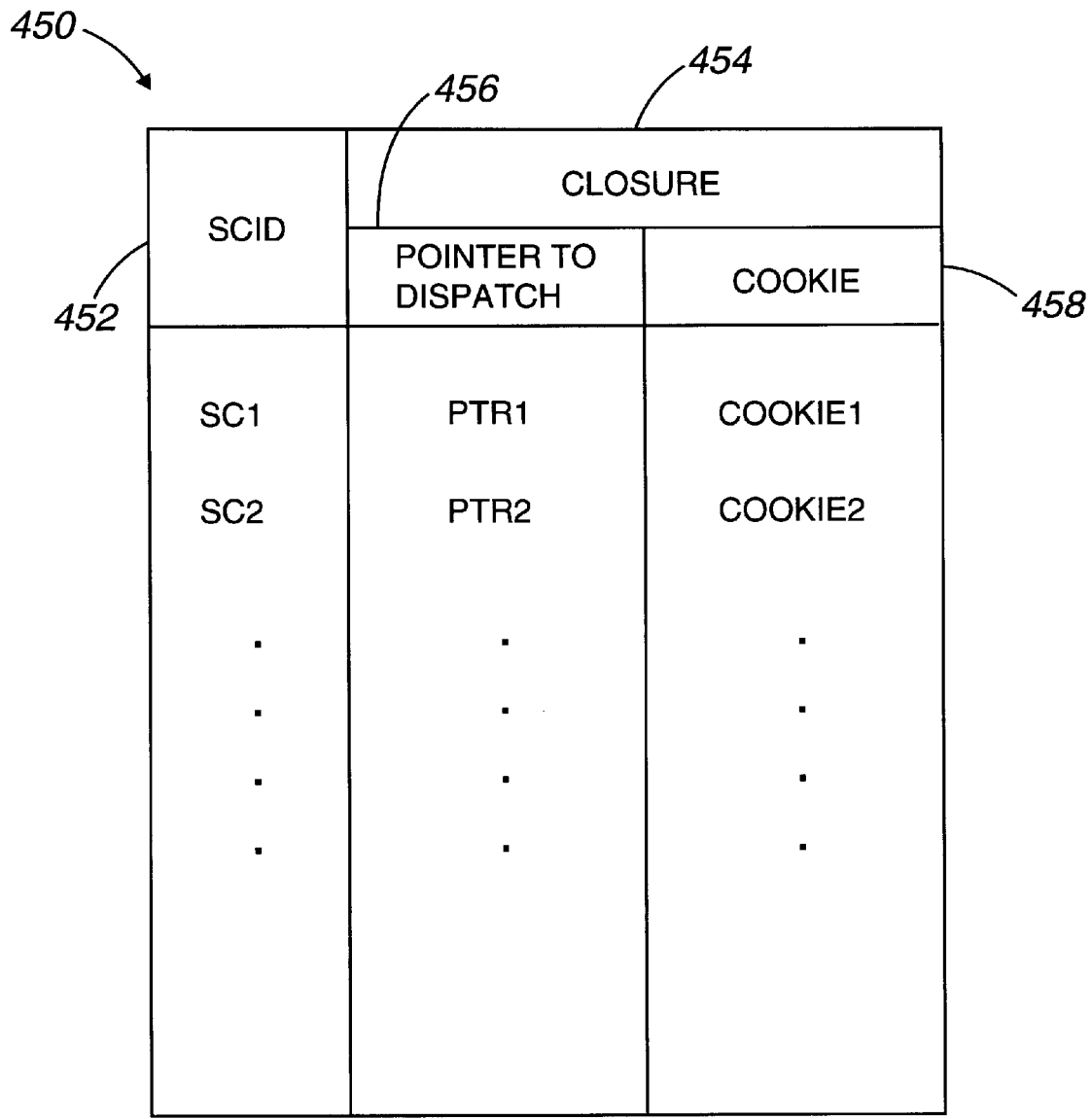
FIG. 6 is a diagrammatic representation of an end point registry data structure in accordance with one embodiment of the present invention.

FIG. 6 is a representation of an end point registry data structure 450 in accordance with one embodiment of the present invention. Each end point which supports multiple subcontracts may have an associated end point registry, or end point dispatch registry. Hence, with reference to FIG. 4, any subcontract which is associated with a cluster end point is typically added to the end point registry for the cluster end point. End point registry 450 is comprised of a listing of keys 452 and closures 454 which are associated with keys 452. Key 452 is typically a subcontract identifier (SCID). In the described embodiment, the subcontract identifier is encoded as the first four bytes of the object key which is a part of an object reference, as described above with respect to FIG. 1c. However, in alternative embodiments, the form, size, location and contents of the subcontract identifier may be widely varied. In any case, the transport mechanism that implements a cluster end point that supports multiple subcontracts contains the appropriate logic to obtain the subcontract identifier of the target object being invoked. Usually, end points are implemented by a transport, and the transport is determined by the transport protocol which determines the encoding of target object references in the request message.

In general, a closure is an object with a "message" on it that holds a state. Each closure, as for example closure 454, includes a pointer to a dispatch 456, or a dispatch function, and a pointer to a data element in a piece of memory. Specifically, the pointer to a data element is a pointer to opaque data which is important to the dispatch function 456 with which it is associated. In the described embodiment, the pointer to a data element is known as a cookie 458. An end point may be mapped to a specific subcontract with an associated closure 454, which holds pointer to a dispatch function 456 and cookie 458, found using end point registry 450. That is, given a subcontract identifier as key 452, closure 454 may be located. Located closure 454 may then be used to properly call the dispatch function 456 provided by the subcontract identified by key 452 to process the call. Cookie 458 points to data maintained and required by the subcontract to process the call, and will be passed as an argument to dispatch function 456.

In the described embodiments, end point registries are only associated with cluster end points (i.e. those end points that may be associated with more than one subcontract). The use of a subcontract identifier as a key in an end point registry to determine an appropriate dispatch method is an efficient mechanism for identifying the appropriate dispatch method for a subcontract.

As mentioned earlier, a three-level dispatch mechanism may be used to dispatch a received request on a server from the transport layer to the subcontract layer, then from the subcontract layer to the skeleton layer and the servant object. The use of subcontracts and a subcontract layer serves, among other purposes, the purpose of decoupling the skeleton layer from the transport layer. This decoupling of the skeleton layer and the transport layer with the subcontract layer provides for a modular framework which facilitates the implementation of changes into the overall dispatch framework. In other words, the subcontract layer may serve as an interface layer which enables changes to be readily made to the dispatch framework. As described above with reference to FIG. 6, an end point registry may be used to locate the proper closure, and therefore dispatch method, to use to dispatch a request received on an end point in the transport layer to the appropriate subcontract in the subcontract layer. The dispatch method used to dispatch a request to the appropriate subcontract will be referred to herein as a transport to subcontract dispatch method.

The particular method used to dispatch a request from a subcontract in the subcontract to the skeleton layer and the servant object is dependent upon the implementation suite which uses the subcontract. That is, the method used to dispatch a request to the skeleton layer, also known as a skeleton dispatch method, is dependent upon both the particular client-server system on which the dispatch is being performed and the particular object being invoked. By way of example, if a persistent object is to be invoked, the implementation suite used may be an object adapter, as for example a Low-overhead Object Adapter (LOA). A subcontract to skeleton layer dispatch mechanism suitable for use in invoking persistent objects will be described below with reference to FIGS. 7a, 7b, and 7c. A more detailed description of the Low-overhead Object Adapter dispatch mechanism may be found in co-pending patent application Ser. No. 08/669,782, filed Jun. 26, 1996, now U.S. Pat. No. 5,991, 823.

It should be appreciated that the subcontract to skeleton layer dispatch mechanism may be widely varied depending upon the system with which the dispatch mechanism is associated and the object being invoked on the server. By way of example, the dispatch mechanism used in the process of invoking a transient object may differ from the dispatch mechanism used in the process of invoking a persistent object. As there is usually less overhead associated with dispatching a transient object than with dispatching a persistent object, the use of separate dispatch mechanisms for dispatching transient objects may improve the efficiency of the overall process of invoking transient objects. An example of a subcontract to skeleton layer dispatch mechanism suitable for use in the process of invoking a transient object will be described below with reference to FIGS. 8a, 8b, and 8c.

Figure 7A:
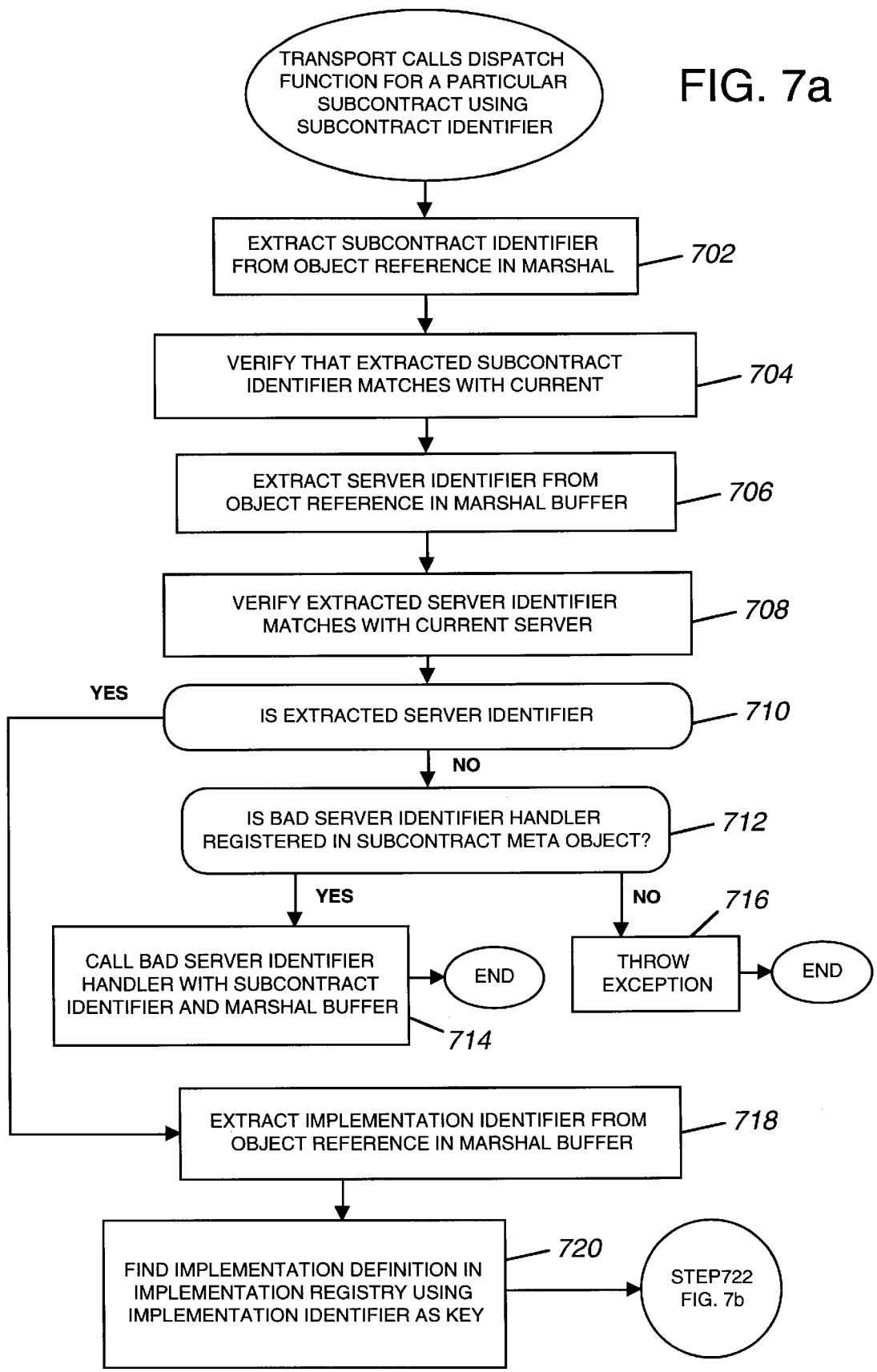
FIGS. 7a and 7b are a process flow diagram which illustrates a method of calling a skeleton dispatch function suitable for persistent objects in accordance with one embodiment of the present invention.

Referring next to FIG. 7a, a method of calling a skeleton dispatch function suitable for dispatching persistent objects in accordance with one embodiment of the present invention will be described. The process begins after the transport layer calls the dispatch function for a particular subcontract using the subcontract identifier (SCID). In some embodiments, end points, as for example door end points, in the transport layer may only have a single associated subcontract and, therefore, a single dispatch function. In other embodiments, as described above with respect to FIG. 6, end points may have end point dispatch registries which may be used to determine the appropriate dispatch function to use to dispatch a request to the appropriate subcontract identified by the subcontract identifier. The subcontract identifier is contained within the object reference as shown in FIG. 1c. Hence, the transport layer is able to "peek" at this subcontract identifier in order to determine which dispatch function should be called to access the appropriate subcontract. In some embodiments, a PEEK_CID method may be used to peek at the subcontract identifier.

After the appropriate subcontract is accessed, the subcontract identifier is extracted from the object reference in the marshal buffer in step 702. The process of extraction means that information which is taken from the marshal buffer is no longer available in the marshal buffer. Next, in step 704, this extracted subcontract identifier is compared with the current subcontract that is being utilized in order to verify that the appropriate subcontract is being used. As described above, during object development, an application developer associates a particular subcontract with an object by using a subcontract identifier.

In step 706 the server identifier (ID) is extracted from the object reference in the marshal buffer. The server object that is the subject of the invocation is present within a particular server process on a host computer; thus, it is important to verify that this server identifier matches the identifier of the current server. In step 708 this extracted server identifier is compared with the identifier of the current server in order to determine if the object reference is referencing the appropriate server process. Step 710 determines if the extracted server identifier is valid and does indeed match the identifier of the current server. If the server identifiers do not match, the indication is that the server identifier is invalid and appropriate action should be taken. This action may be performed by a bad server identifier handler function. Step 712 is the determination of whether an appropriate bad server identifier handler is registered in the subcontract meta object associated with the current subcontract. Because the subcontract identifier has already been extracted from the object reference, this step may be performed by using the subcontract registry of FIG. 2. The subcontract identifier acts as a key to a particular row of the subcontract registry that allows a search of the "other functions" column in order to determine if the bad server identifier handler is present for the current subcontract. If the handler is not present, then in step 716, the system throws an exception relating to this situation, and the dispatch function ends. If, however, the handler is registered in the subcontract meta object, then the registered bad server identifier handler is called with the subcontract identifier and the marshal buffer as arguments in step 714. After the bad server handler is called, the dispatch function ends.

Returning now to step 710 which is the determination of whether the extracted server identifier is valid, if it is determined that the extracted server identifier does match with the current server, then process control moves to step 718 where the implementation identifier is extracted from the object reference in the marshal buffer. In step 720 this extracted implementation identifier is used as a key to the implementation registry of FIG. 3 in order to find the implementation definition which corresponds to the implementation identifier. The use of the implementation registry is explaned above with reference to FIG. 3. The step of finding the appropriate implementation definition may be performed conceptually by searching through the column of possible implementation identifiers of the implementation registry in order to determine if the implementation identifier extracted in step 718 is present in the registry.

Figure 7B:
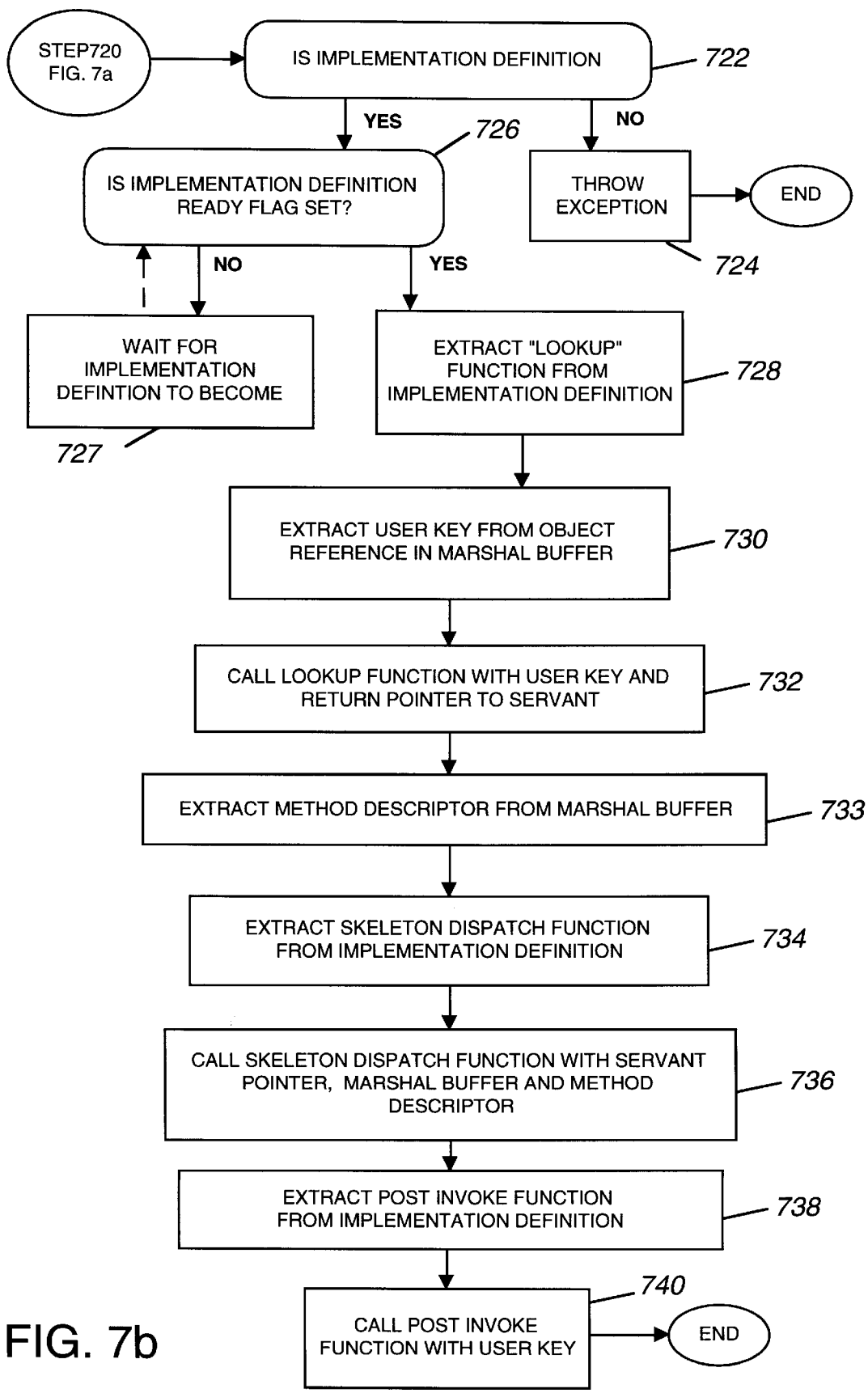

Referring next to FIG. 7b, the remaining steps in the skeleton dispatch function suitable for dispatching persistent objects, as described with reference to FIG. 7a, in accordance with one embodiment of the present invention will be described. In step 722, a determination is made regarding whether an appropriate implementation definition was found in the implementation registry. If it is determined that an appropriate implementation definition was not found in step 722, an exception is thrown in step 724 relating to this condition, and the dispatch function ends. If, however, an appropriate implementation definition is found, then the process flow may proceed with use of the definition.

However, in some cases, even if an implementation definition is found, it may not necessarily be ready for use. An implementation definition is ready, or prepared, if the step of preparing an implementation definition has been executed. A method of preparing an implementation definition is described in co-pending patent application Ser. No. 08/669,782, filed Jun. 26, 1996, now U.S. Pat. No. 5,991,823. Once the step of preparing an implementation definition has been executed, a "ready flag" corresponding to a particular implementation definition will be set to indicate that the implementation definition is ready for use. The determination of whether the ready flag corresponding to the implementation definition found in step 720 of FIG. 7a has been set is made in step 726. If it is determined that the ready flag has not been set, the dispatch function enters a wait state in which it waits for the implementation definition to become ready in step 727. That is, the dispatch function waits for the associated ready flag to be set to a state which is indicative of the readiness of an implementation definition for use. Once the implementation definition is ready, control moves from the determination of whether the appropriate ready flag is set in step 726 to step 728, where the lookup function is extracted from the implementation definition. This lookup function is one of the call back functions of located in the implementation registry shown in FIG. 3, and will be used to produce a localized pointer to the called servant. In step 730, the user key is extracted from the object reference in the marshal buffer. Next, in step 732, the lookup function is called with the user key as an argument. Once the lookup function is executed, it will return a pointer to the servant. The pointer to a servant may be implemented in the local language of the server. By way of example, this pointer may be a C++ object pointer that references the servant C++ object.

Once a local pointer has been obtained to point to the called servant object, the dispatch function is ready to execute the appropriate method upon the servant object that was originally requested by the client. In step 733, a method descriptor is extracted from the marshal buffer. A method descriptor is a data structure which holds the method name, as understood by the client, which is defined upon the servant that the client wishes to invoke. In step 734, the skeleton dispatch function is extracted from the implementation definition. This skeleton dispatch function may be found in the implementation registry of FIG. 3 in the column which holds skeleton information. The extracted skeleton dispatch function is called, in step 736, with arguments which include the servant pointer, the marshal buffer, and the method descriptor. The skeleton dispatch function will be described below with reference to FIG. 7c. The skeleton dispatch function achieves the result of executing the method upon the servant that the client originally requested. Once this operation, i.e. the execution of the requested method, has taken place, the invocation of the server object by the client is typically completed. However, in some embodiments, an additional function may be executed. The post invoke function is a developer defined function for each implementation that achieves a functionality that the developer desires. In step 738, the post invoke function is extracted from the implementation definition. The post invoke function is then called with the user key as an argument in step 740. The post invoke function may be used by the developer to perform a particular action after the invocation of an object.

Figure 7C:
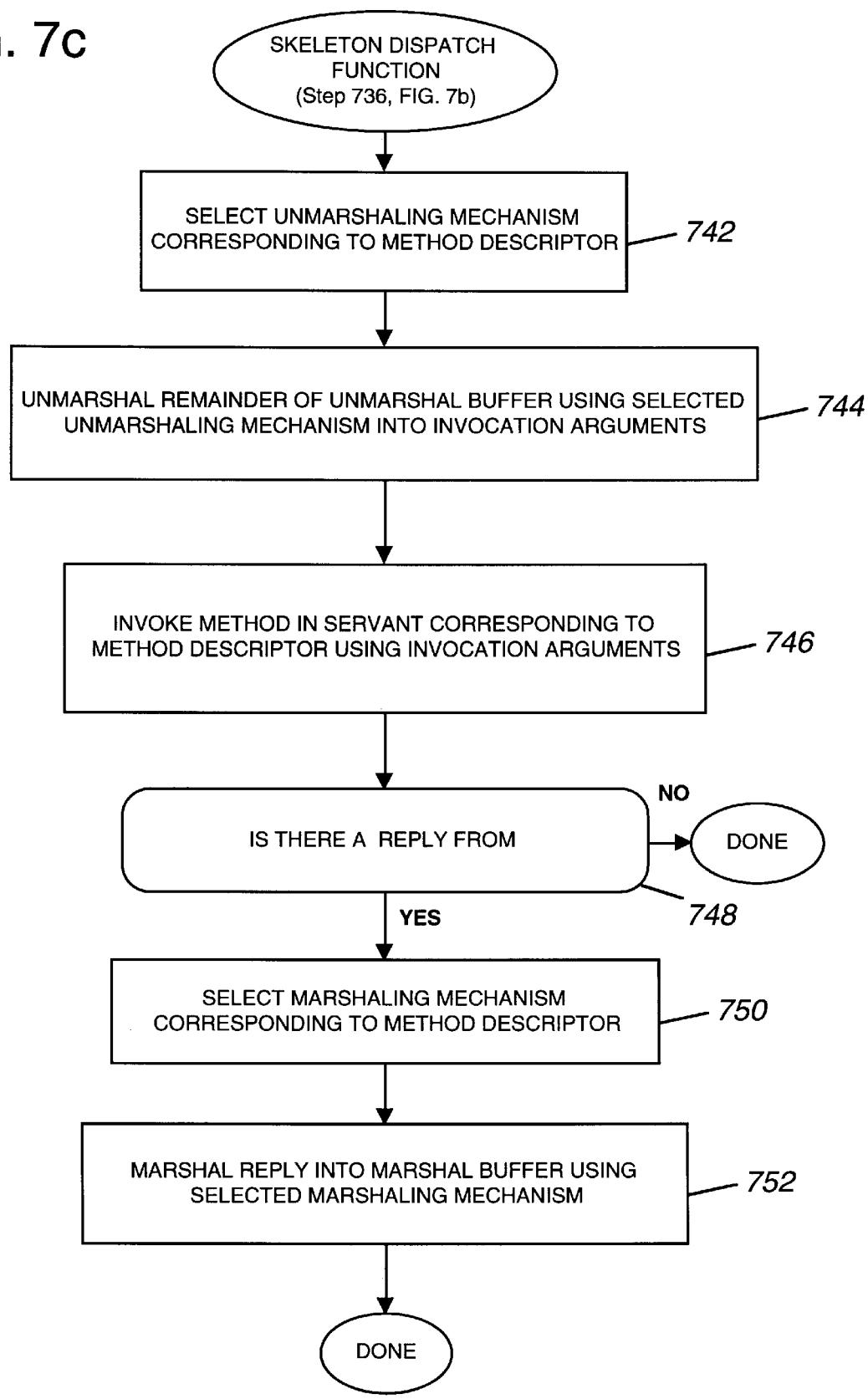
FIG. 7c is a process flow diagram which illustrates a method of executing a skeleton dispatch function, i.e. step 736 of FIG. 7b, in accordance with one embodiment of the present invention.

Referring next to FIG. 7c, a method of executing the skeleton dispatch function, i.e. step 736 of FIG. 7b, in accordance with one embodiment of the present invention will be described. The call to the skeleton dispatch function begins at step 742 where an unmarshaling mechanism, which corresponds to the method descriptor with which the call to the skeleton dispatch function is made, is selected. In some embodiments, the unmarshaling mechanism may be a sequence of code that is selected by a switch statement. As other information has previously been extracted from the marshal buffer, the only information remaining in the marshal buffer at this point are the arguments used by the method to be called. In step 744, the selected unmarshaling mechanism is used to unmarshal the remainder of the marshal buffer into invocation arguments. After invocation arguments are obtained, in step 746, the method descriptor is used to invoke the method defined upon the servant using the invocation arguments. Invoking the method in the servant using invocation arguments has the effect of executing the method that was originally requested by the client. It is possible that the invoked method may return no value and may instead perform other functions, or it may be that the method returns a value to the client. After the method in the servant is invoked, a determination is made in step 748 regarding whether the invoked method produces a reply. If no reply is produced then the execution of the skeleton dispatch function is done. If a reply is produced, control moves to step 750 where an appropriate marshaling mechanism which corresponds to the method descriptor is selected. After the marshaling mechanism is selected, the selected marshaling mechanism is used to marshal the reply into a marshal buffer in step 752. The marshaling mechanism will typically marshal a reply header before marshaling reply arguments. In the event that the reply contains more bytes than the marshal buffer which contained the object reference is capable of encapsulating, a new marshal buffer may be created to encapsulate the reply. Otherwise, the reply is marshaled into the marshal buffer which contained the request. After the reply is marshaled into the marshal buffer, the reply is ready to be returned through the transport layer to the client.

Although one dispatch mechanism has been described with reference to FIGS. 7a, 7b, and 7c, it should be appreciated that a wide variety of other mechanisms may be provided in accordance with the multi-level dispatch mechanism of the present invention. By way of another example, a dispatch mechanism which is easier to customize than the dispatch mechanism described above may be implemented. The differences in the three-level dispatch mechanisms are due, for the most part, to the fact that implementation as described with respect to FIGS. 7a, 7b, and 7c does not readily support the incorporation of custom objects. By way of example, as described above with reference to FIGS. 7a, 7b, and 7c, the dispatch process generally involves the identification of an appropriate implementation, whereas the dispatch process used in the invocation which supports custom objects will not involve the identification of an appropriate implementation, as there is typically only one associated implementation, and perhaps even only one associated servant object.

Figure 8A:
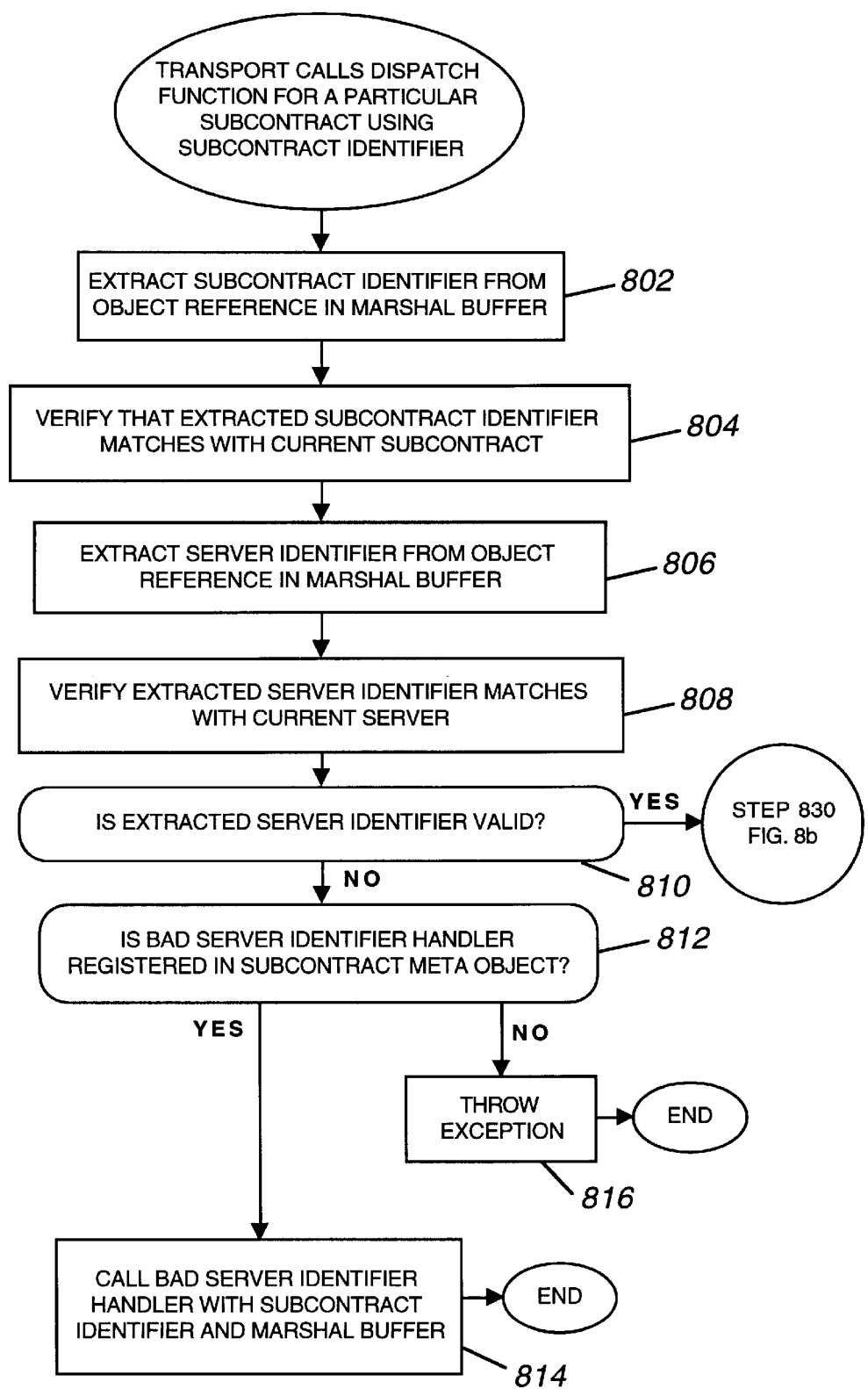
FIGS. 8a and 8b are a process flow diagram which illustrates a method of calling a skeleton dispatch function suitable for persistent objects in accordance with a second embodiment of the present invention.

Referring next to FIG. 8a, a method of calling a skeleton dispatch function suitable for dispatching persistent objects in accordance with a second embodiment of the present invention will be described. The process begins after the transport layer calls the dispatch function for a particular subcontract using the subcontract identifier (SCID). In some embodiments, end points, as for example door end points, in the transport layer may only have a single associated subcontract and, therefore, a single dispatch function. In such embodiments, the end point will dispatch directly to the associated subcontract after a request is received. In other embodiments, as described above with respect to FIG. 6, end points may have end point dispatch registries which may be used to determine the appropriate dispatch function to use to dispatch a request to the subcontract identified by the subcontract identifier. The subcontract identifier is contained within the object reference as shown in FIG. 1c. Hence, in such embodiments, the transport layer is able to peek at this subcontract identifier in order to determine which dispatch function should be called in order to access the appropriate subcontract. In some embodiments, a PEEK_SCID method may be used to peek at the subcontract identifier.

After the appropriate subcontract is accessed, that is, after the request has been dispatched to the appropriate subcontract, the subcontract identifier is extracted from the object reference in the marshal buffer in step 802. The process of extraction means that information which is taken from the marshal buffer is no longer present in the marshal buffer. Next, in step 804, this extracted subcontract identifier is compared with the current subcontract that is being utilized in order to verify that the appropriate subcontract is being used. As described above, during object development, an application developer associates a particular subcontract with an object by using a subcontract identifier.

In step 806 the server identifier (ID) is extracted from the object reference in the marshal buffer. The server object that is the subject of the invocation is present within a particular server process on a host computer; thus, it is important to verify that this server identifier matches the identifier of the current server. In step 808 this extracted server identifier is compared with the identifier of the current server in order to determine if the object reference is referencing the appropriate server process. Step 810 determines if the extracted server identifier is valid and does indeed match the identifier of the current server. If the server identifiers do not match, the indication is that the server identifier is invalid and appropriate action should be taken. This action may be performed by a bad server identifier handler function. Step 812 is the determination of whether an appropriate bad server identifier handler is registered in the subcontract meta object associated with the current subcontract. Because the subcontract identifier has already been extracted from the object reference, this step may be performed by using the subcontract registry of FIG. 2. The subcontract identifier acts as a key to a particular row of the subcontract registry that allows a search of the "other functions" column in order to determine if the bad server identifier handler is present for the current subcontract. If the handler is not present, then in step 816, the system throws an exception relating to this situation, and the dispatch function ends. If, however, the handler is registered in the subcontract meta object, then the registered bad server identifier handler is called with the subcontract identifier and the marshal buffer as arguments in step 814. After the bad server handler is called, the dispatch function ends.

Figure 8B:
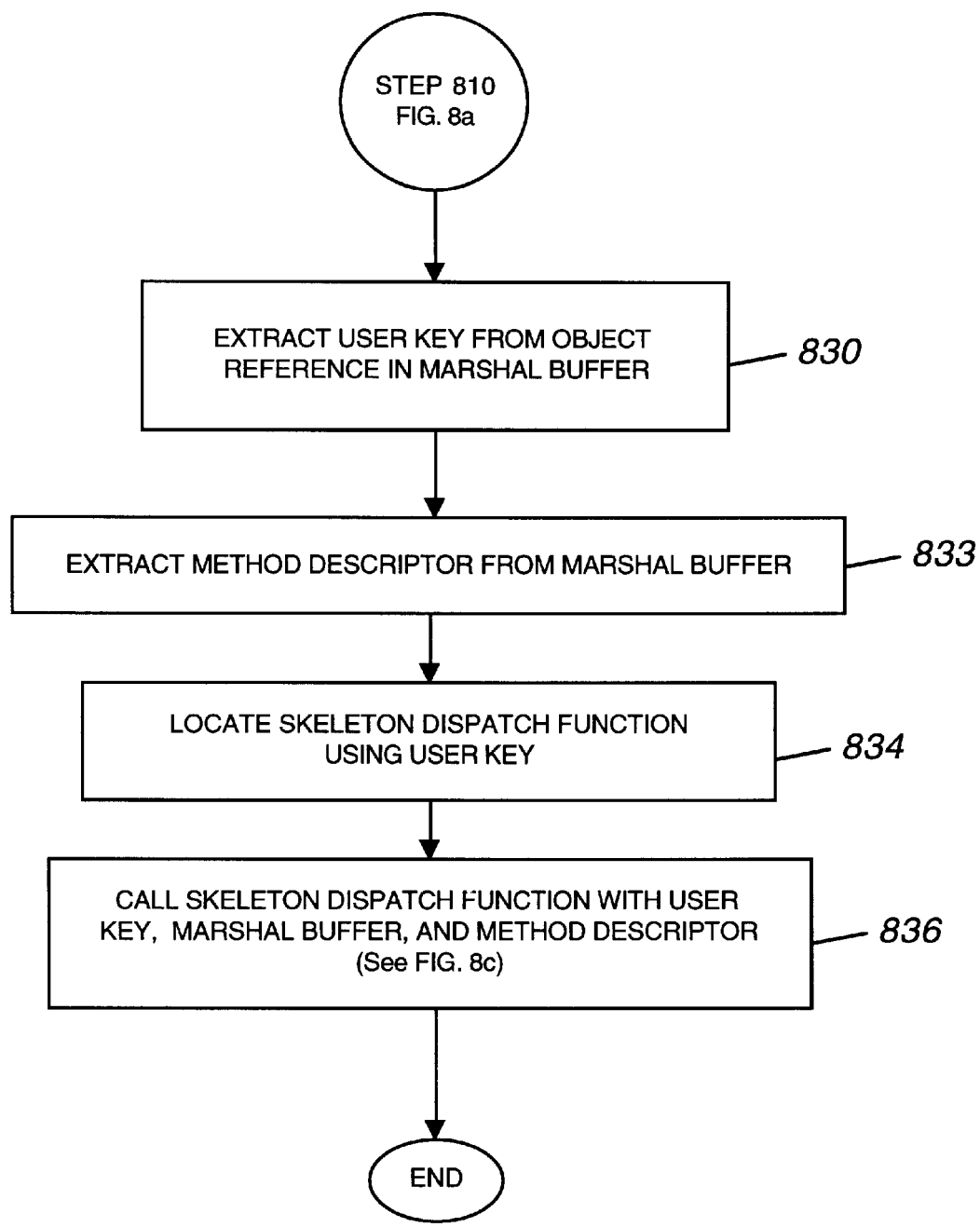

Returning now to step 810 which is the determination of whether the extracted server identifier is valid, if it is determined that the extracted server identifier does match with the current server, then process control moves to step 830 of FIG. 8b, where a user key is extracted from the object reference encapsulated in the marshal buffer.

Referring next to FIG. 8b, the remaining steps in the method of calling a skeleton dispatch function suitable for dispatching persistent objects, as described with reference to FIG. 8a, in accordance with a second embodiment of the present invention will be described. In step 830, the user key is extracted from the object reference in the marshal buffer. Next, in step 833, a method descriptor is extracted from the marshal buffer. A method descriptor, as mentioned above, is a data structure which holds the method name, as understood by the client, which is defined upon the servant that the client wishes to invoke. In step 834, the skeleton dispatch function is located in the marshal buffer using the user key extracted in step 830. The extracted skeleton dispatch function is called, in step 836, with arguments which include the user key, the marshal buffer, and the method descriptor. The skeleton dispatch function will be described below with reference to FIG. 8c. The skeleton dispatch function achieves the result of executing the method upon the servant that the client originally requested. Once this operation, i.e. the execution of the requested method, has taken place, the invocation of the server object by the client is typically completed.

Figure 8C:
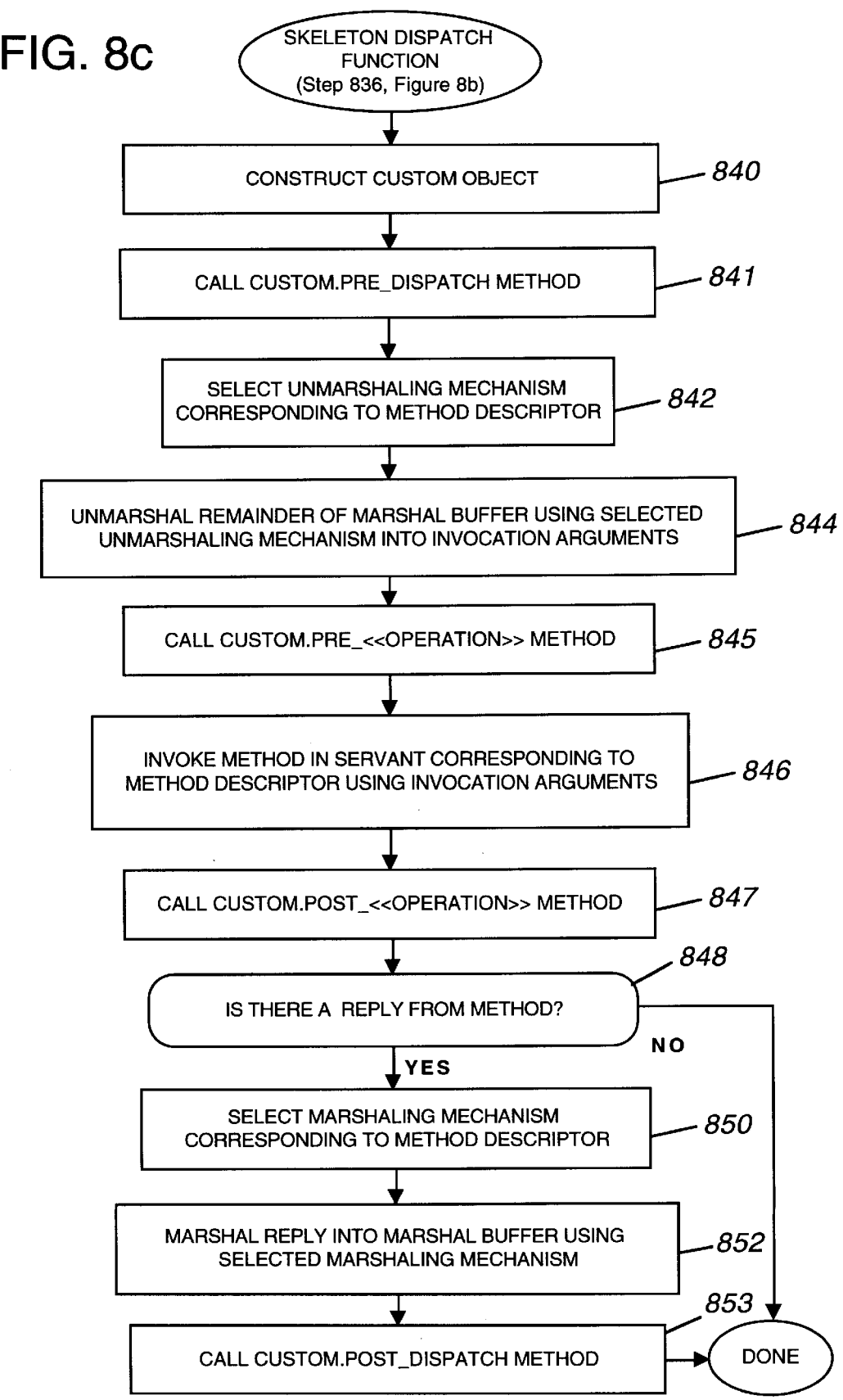
FIG. 8c is a process flow diagram which illustrates a method of executing a skeleton dispatch function, i.e. step 836 of FIG. 8b, in accordance with a second embodiment of the present invention.

Referring next to FIG. 8c, a method of executing the skeleton dispatch function, i.e. step 836 of FIG. 8b, in accordance with a second embodiment of the present invention will be described. It should be appreciated that the method of executing the skeleton dispatch function described with reference to FIG. 8c differs from the method of executing the skeleton dispatch function described with reference to FIG. 7c in that the method described with reference to FIG. 8c enables externally provided modules of code to be executed.

The call to the skeleton dispatch function begins at step 840 where custom objects are constructed. In other words, any custom objects, or modules of application code provided by a developer, are constructed. It should be appreciated that if custom objects are not present, then no custom objects are constructed. In step 841, a call is made to a custom pre-dispatch (CUSTOM.PRE_DISPATCH) method. The custom pre-dispatch method is a method provided by an application developer, and typically uses the user key, which is passed as an argument in a call to the skeleton dispatch function, to determine the appropriate servant to use to invoke the method identified in the method descriptor. The provision of allowing for the inclusion of a custom pre-dispatch method is possible through the use of a "custom hook." A custom hook enables external code to be inserted into and executed as part of the call to the skeleton invoke method. If the custom hook is not used, i.e. if there is no external code, then process flow does not execute a custom pre-dispatch method. If the custom hook is used, then the custom pre-dispatch method provided by an application developer is executed. It should be appreciated that this custom hook, like others, is provided to enable external code to be efficiently executed as a part of the call to a skeleton dispatch method.

After the call to the custom pre-dispatch method, process flow moves to step 842 where an unmarshaling mechanism, which corresponds to the method descriptor with which the call to the skeleton dispatch function is made, is selected. In some embodiments, the unmarshaling mechanism may be a sequence of code that is selected by a switch statement. As other information has previously been extracted from the marshal buffer, the only information remaining in the marshal buffer at this point are the arguments used by the method to be called.

In step 844, the selected unmarshaling mechanism is used to unmarshal the remainder of the marshal buffer into invocation arguments. After invocation arguments are obtained, in step 845, a call is made to a custom pre-operation (CUSTOM.PRE_<<OPERATION>>) method. The name of the "operation" is dependent upon the name of the IDL method called. In some embodiments, the operation may be the acquisition of either a read lock or a write lock. A read lock may be used to prevent write operations from occurring on a global variable at any given time, whereas a write lock may be used to prevent any read operations and more than one write operation from occurring on a global variable at any given time. The call to the custom pre-operation is associated with a custom hook. That is, if external custom pre-operation code is provided by a user, the custom hook is considered to be active, and the external custom pre-operation code is executed. If no external code is provided, the presence of the inactive custom hook does not in any way compromise the efficiency of the call to the skeleton dispatch method.

After the call to the custom pre-operation method, in step 846, the method descriptor is used to invoke the method defined upon the servant using the invocation arguments. Invoking the method in the servant using invocation arguments has the effect of executing the method that was originally requested by the client. It is possible that the invoked method may return no value and may instead perform other functions, or it may be that the method returns a value to the client. In some embodiments when a costume pre-operation method is used, the invoked method may not perform any functions, as the invocation of the method may be a part of the custom pre-operation method. After the method in the servant is invoked, a call is made in step 847 to a custom post-operation (CUSTOM.POST_<<OPERATION>>) method. The name of the "operation" is dependent upon the name of the IDL method called. The custom post-operation method is paired with the custom pre-operation method. In other words, if a custom pre-operation method is in existence, the custom post-operation method typically must also be in existence. In embodiments where the custom pre-operation method is the acquisition of either a read lock or a write lock, the corresponding custom post-operation method is typically the release of either the read lock or the write lock, respectively. As was the case for the custom pre-operation method, the inclusion of a custom post-operation method is also made possible by the use of a custom hook. After the custom post-operation method is called, a determination is made in step 848 regarding whether the invoked method produces a reply. If no reply is produced then process control proceeds to step 853 where a call is made to a custom post-dispatch (CUSTOM.POST_DISPATCH) method. If a reply is produced, control moves to step 850 where an appropriate marshaling mechanism which corresponds to the method descriptor is selected.

Once the marshaling mechanism is selected, the selected marshaling mechanism is used to marshal the reply into a marshal buffer in step 852. In the event that the reply contains more bytes than the marshal buffer which contained the object reference is capable of encapsulating, a new marshal buffer may be created to encapsulate the reply. Otherwise, the reply is marshaled into the marshal buffer which contained the request. After the reply is marshaled into the marshal buffer, a call is made to a custom post-dispatch (CUSTOM.POST_DISPATCH) method in step 853. The custom post-dispatch method, which is paired with a custom pre-dispatch method, is typically used for reference counting. That is, the custom post-dispatch method is typically used to keep track of threads, which are used to execute methods, in the sense of counting the number of threads which are executing methods at the time the custom post-dispatch method is called. Again, a custom hook is used to make it possible to include application code pertaining to the custom post-dispatch method. Once the call is made to the custom post-dispatch method, the reply is ready to be returned through the transport layer to the client.

It should be appreciated that the subcontract dispatch method may be further divided into a plurality of sub-layers to improve modularity. By way of example, two sub-layers, a lower sub-layer and a higher sub-layer may be used. This division of the subcontract dispatch method usually occurs when a subcontract supports multiple transports and, hence, is registered with different types of end points provided by the many transports utilized by the subcontract. This subcontract may register a different dispatch closure with each end point, due to the fact that the method used to unmarshal the request header which includes the target object reference, i.e. the method identifier, differs depending on the transport and, hence, the end point, used to deliver the request message. In other words, the method in the lower sub-layer used to unmarshal the request provides the "logic glue" that is used to decode the transport specific request header information required by the subcontract. The dispatch function referenced by a transport-to-subcontract dispatch closure may implement this logic glue. This logic glue eventually calls the function in the upper sub-layer that implements transport-independent, subcontract-dependent processing. This processing may include a lookup of servant object implementation definitions, transaction processing, security checks, calling skeleton dispatch functions, etc.

The subdivision of the subcontract dispatch method into sub-layers, providing transport-dependent and transport-independent processing, provides additional flexibility in evolving the subcontract layer. By way of example, one subcontract which supports a transport may be incorporated into a more powerful subcontract in order to support another transport, with minimal changes to the overall system.

Figure 9:
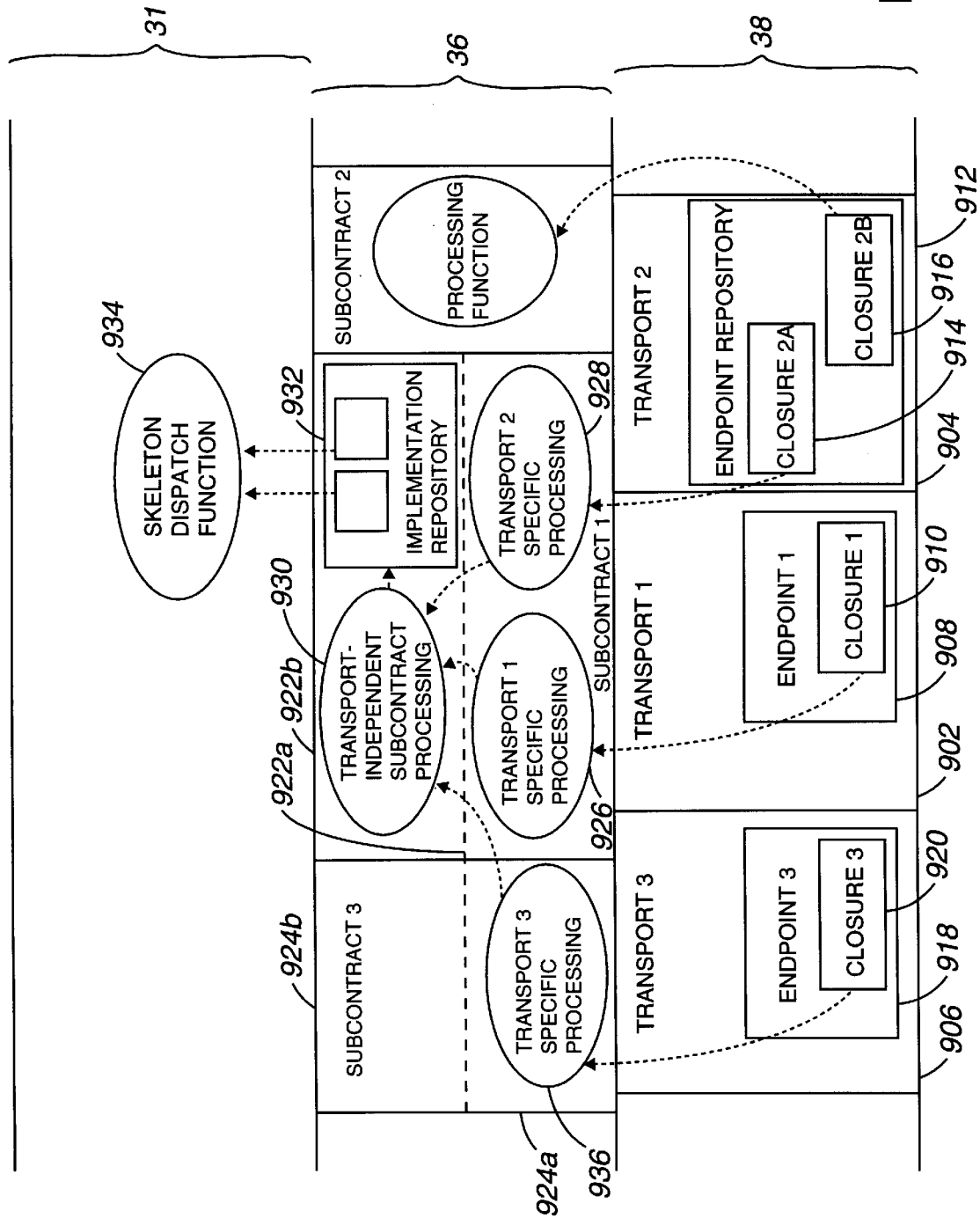
FIG. 9 is a diagrammatic representation of a subcontract dispatch mechanism which is divided into sub-layers in accordance with a third embodiment of the present invention.

Referring next to FIG. 9, a subcontract dispatch mechanism which is divided into sub-layers in accordance with a third embodiment of the present invention will be described. FIG. 9 is a diagrammatic representation of transport layer 38, subcontract layer 36, and skeleton layer 31 on the server side of a distributed object systems. Transport layer 38 includes three transport mechanisms, namely "transport 1" 902, "transport 2" 904 and "transport 3" 906. "Transport 1" 902 has an end point, "end point 1" 908, and a closure, "closure 1" 910, associated therewith. As shown, "end point 1" 908 is a dedicated end point. "Closure 1" 910 may be used to dispatch information from transport layer 38 to subcontract layer 36. "Transport 2" 904 has an associated end point dispatch registry 912 and associated closures, as for example "closure 2A" 914 and "closure 2B" 916. End point dispatch registry 912 is used as end points associated with "transport 2" 904 are cluster end points. "Transport 3" 906 has an associated dedicated end point, "end point 3" 918, which is associated with "closure 3" 920.

As mentioned earlier, the subcontract dispatch method may be divided into a plurality of sub-layers to improve modularity. "Subcontract 1" 922 and "subcontract 3" 924 are each divided into a lower sub-layer, 922a and 924a, respectively, and an upper sub-layer, 922b and 924b, respectively. The division of the subcontract dispatch method usually occurs when a subcontract, as for example "subcontract 1" 922, supports multiple transports. The methods in lower sub-layer 922a, for example, are a transport specific, i.e. transport-dependent, processing method 926 which is associated with "transport 1" 902, and a transport specific processing method 928 which is associated with "transport 2" 904. Methods 926,928 are used to decode the transport specific request header information required by "subcontract 1" 922, and are eventually used to call the transport-independent subcontract processing function 930 in upper sub-layer 922b that implements transport-independent, subcontract-dependent processing. This processing may include a lookup of servant object implementation definitions in implementation repository 932 which may be used to access a skeleton dispatch function 934 in skeleton layer 31.

The subdivision of the subcontract dispatch method into sub-layers further provides additional flexibility in evolving subcontract layer 36. As mentioned earlier, one subcontract which supports a transport may be incorporated into a more powerful subcontract in order to support another transport, with minimal changes to the overall system. "Subcontract 1" 922 is incorporated as a part of "subcontract 3" 924, which is more "powerful" than "subcontract 1" 922 in that "subcontract 3" 924 supports "transport 3" 906. In other words, "subcontract 1" 922 is incorporated as a part of "subcontract 3" 924, thereby enabling "subcontract 3" 924 to support "transport 1" 902, "transport 2" 904, and "transport 3" 906. This incorporation involves a transport specific processing method 936 in lower sub-layer 924a of "subcontract 3" 924 which utilizes transport-independent subcontract processing method 930 associated with "subcontract 1" 922. The use of sub-layers in the subcontract dispatch method, and, hence, the use of the same transport-independent subcontract processing method for more than one subcontract increases the flexibility of subcontract layer 36, as subcontracts may be incorporated as components of other subcontracts, with minimal modifications being made to subcontract layer 36.

The present invention also relates to an apparatus for performing the operations as described above. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 10:
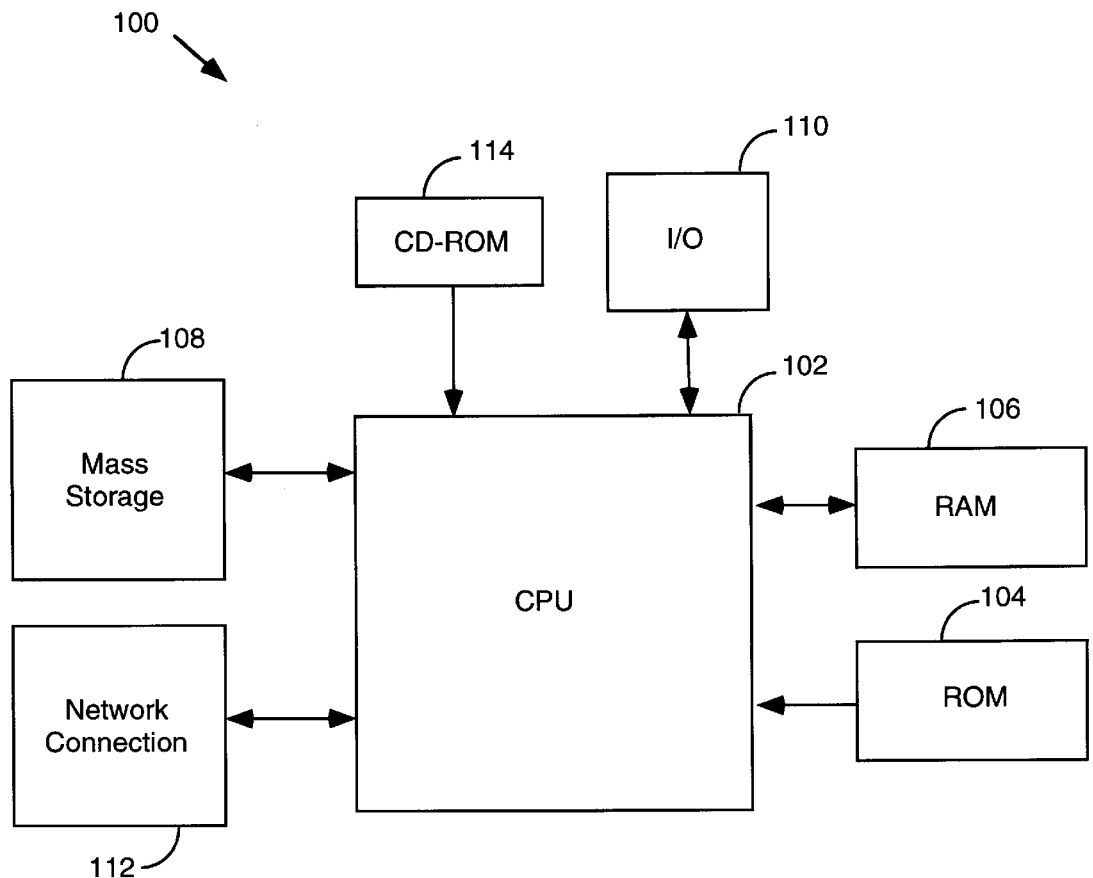
FIG. 10 is a diagrammatic illustration of a representative computer suitable for implementing the distributed object system of the present invention.

FIG. 10 illustrates a typical computer system in accordance with the present invention. The computer system 100 includes any number of processors 102 (also referred to as central processing units, or CPUs) that is coupled to memory devices including primary storage devices 104 (typically a read only memory, or ROM) and primary storage devices 106 (typically a random access memory, or RAM). As is well known in the art, ROM 104 acts to transfer data and instructions uni-directionally to the CPU and RAM 106 is used typically to transfer data and instructions in a bi-directional manner. Both primary storage devices 104, 106 may include any suitable computer-readable media as described above. A mass memory device 108 is also coupled bi-directionally to CPU 102 and provides additional data storage capacity. The mass memory device 108 may be used to store programs, data and the like and is typically a secondary storage medium such as a hard disk that is slower than primary storage devices 104, 106. Mass memory storage device 108 may take the form of a magnetic or paper tape reader or some other well-known device. It will be appreciated that the information retained within the mass memory device 108, may, in appropriate cases, be incorporated in standard fashion as part of RAM 106 as virtual memory. A specific mass storage device such as a CD-ROM 114 may also pass data uni-directionally to the CPU.

CPU 102 is also coupled to one or more input/output devices 110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. In the described embodiments, although only two subcontract layer to skeleton layer dispatch functions, i.e. skeleton dispatch functions, have been described, it should be appreciated that the skeleton dispatch functions may be widely varied within the scope of the present invention, as the skeleton dispatch function used as a part of a three-level dispatch mechanism is dependent upon the particular system on which the dispatch mechanism is implemented. By way of example, object adapters other than Low-overhead Object Adapters may be utilized.

Further, in the described embodiments, the transport layer to subcontract layer dispatch mechanism is a closure. It should be appreciated that the transport to subcontract layer dispatch mechanism may also be widely varied, depending upon the particular system on which the three-level dispatch mechanism is implemented. By way of example, end point to subcontract mappings may vary depending upon the configuration of the transport layer in which the end point is located and the configuration of the subcontract layer.

Additionally, in the described embodiments, specific end point, subcontract, and implementation registries have been described. It will be apparent that these registries can be widely varied within the scope of the present invention. Further, steps involved with methods of calling dispatch functions, as for example a skeleton dispatch function, may be reordered. Steps may also be removed or added without departing from the spirit or the scope of the present invention. Therefore the described embodiments should be taken as illustrative and not restrictive, and the invention should be defined by the following claims and their full scope of equivalents.

What is claimed is:

1. A method for dispatching a distributed object invocation, the method comprising:
    receiving a request at a transport end point, the transport end point being a part of a transport layer;
    dispatching the request from the transport layer to a subcontract arranged to unmarshal at least a part of the request, the subcontract being a part of a subcontract layer;
    at least partially unmarshaling the request using the subcontract;
    dispatching the partially unmarshaled request from the subcontract to a skeleton function, the skeleton function being a part of a skeleton layer; and
    invoking a servant from the skeleton function.

2. A method as recited in claim 1 wherein dispatching the request to the subcontract is accomplished by invoking a closure with a marshal buffer that holds the received request.

3. A method as recited in claim 2 wherein the closure includes a pointer to a dispatch function that forms at least a part of the subcontract, and a pointer to a cookie provided by the subcontract.

4. A method as recited in claim 1 wherein the skeleton function is arranged to unmarshal an additional part of the request.

5. A method as recited in claim 4 wherein the additional part of the request is an argument.

6. A method as recited in claim 1 wherein the subcontract is independent of the language mapping of the servant.

7. A method as recited in claim 1 further including identifying the skeleton function as being appropriate for invoking the servant.

8. A method as recited in claim 7 wherein the subcontract identifies the skeleton function as being appropriate for invoking the servant.

9. A computer program product for dispatching a distributed object invocation within a distributed client/server based computing system, the computer program product comprising:
    computer code for receiving a request at a transport end point, the transport end point being a part of a transport layer;
    computer code for dispatching the request from the transport layer to a subcontract arranged to unmarshal at least a part of the request, the subcontract being a part of a subcontract layer;
    computer code for at least partially unmarshaling the request using the subcontract;
    computer code for dispatching the partially unmarshaled request from the subcontract to a skeleton function, the skeleton function being a part of a skeleton layer;
    computer code for invoking a servant from the skeleton function; and
    a computer readable medium that stores the computer codes.

10. A computer program product as recited in claim 9 wherein the computer code for dispatching the request to the subcontract includes computer code for invoking a closure with a marshal buffer that holds the received request.

11. A computer program product as recited in claim 10 wherein the closure includes a pointer to a dispatch function that forms at least a part of the subcontract, and a pointer to a cookie provided by the subcontract.

12. A computer program product as recited in claim 9 wherein the skeleton function is arranged to unmarshal an additional part of the request.

13. A computer program product as recited in claim 12 wherein the additional part of the request is an argument.

14. A computer program product as recited in claim 9 wherein the subcontract is independent of the language mapping of the servant.

15. A computer-implemented method for dispatching a distributed object invocation using a multi-layered dispatch mechanism, the multi-layered dispatch mechanism including a transport layer, a subcontract layer, and a skeleton layer, the computer-implemented method comprising:

receiving a request at a transport end point, the transport end point being a part of the transport layer;

identifying a subcontract suitable for receiving the request from the transport layer, the suitable subcontract being associated with the transport end point, the suitable subcontract being a part of the subcontract layer, the subcontract layer including a plurality of subcontracts, wherein the subcontract layer is arranged as an interface layer between the transport layer and the skeleton layer;

dispatching the request from the transport layer to the suitable subcontract, the suitable subcontract being arranged to at least partially unmarshal the request, the suitable subcontract further being arranged to identify a skeleton function that is included in the skeleton layer, the skeleton function being appropriate for invoking a servant;

at least partially unmarshaling the request using the suitable subcontract;

identifying the skeleton function using the suitable subcontract;

dispatching the partially unmarshaled request from the suitable subcontract to the skeleton function; and invoking the servant from the skeleton function.

16. A computer-implemented method as recited in claim 15 wherein the transport layer is arranged to unmarshal a part of the request.

17. A computer-implemented method as recited in claim 15 wherein the transport end point is associated with the plurality of subcontracts.

18. A computer-implemented method as recited in claim 15 wherein the suitable subcontract is independent of a language mapping of the servant.

19. A computer-implemented method as recited in claim 15 further including:

identifying the end point as being suitable for receiving the request.

20. A computer-implemented method for dispatching a distributed object invocation using a multi-layered dispatch mechanism, the computer-implemented method comprising:

receiving a request at a transport end point, the transport end point being a part of the multi-layered dispatch mechanism;

identifying a subcontract suitable for receiving the request from the transport end point, the suitable subcontract being a part of the multi-layered dispatch mechanism, the multi-layered dispatch mechanism including a plurality of subcontracts;

dispatching the request from the transport end point to the suitable subcontract, the suitable subcontract being arranged to at least partially unmarshal the request, the suitable subcontract further being arranged to identify a skeleton function that is included in the multi-layered dispatch mechanism, the skeleton function being appropriate for invoking a servant;

at least partially unmarshaling the request using the suitable subcontract;

identifying the skeleton function;

dispatching the partially unmarshaled request from the subcontract to the skeleton function; and invoking the servant from the skeleton function.

21. A computer program product arranged to dispatch a distributed object invocation using a multi-layered dispatch mechanism, the multi-layered dispatch mechanism including a transport layer, a subcontract layer, and a skeleton layer, the computer program product comprising:

computer code for receiving a request at a transport end point, the transport end point being a part of the transport layer;

computer code for identifying a subcontract suitable for receiving the request from the transport layer, the suitable subcontract being associated with the transport end point, the suitable subcontract being a part of the subcontract layer, the subcontract layer including a plurality of subcontracts, wherein the subcontract layer is arranged as an interface layer between the transport layer and the skeleton layer;

computer code for dispatching the request from the transport layer to the suitable subcontract, the suitable subcontract being arranged to at least partially unmarshal the request, the suitable subcontract further being arranged to identify a skeleton function that is included in the skeleton layer, the skeleton function being appropriate for invoking a servant;

computer code for at least partially unmarshaling the request using the suitable subcontract;

computer code for identifying the skeleton function using the suitable subcontract;

computer code for dispatching the partially unmarshaled request from the subcontract to the skeleton function;

computer code for invoking the servant from the skeleton function; and a computer readable medium that stores the computer codes.

\* \* \* \* \*